(12) United States Patent
Wang et al.

(10) Patent No.: US 8,974,560 B2
(45) Date of Patent: Mar. 10, 2015

(54) COATED ABRASIVE AGGREGATES AND PRODUCTS CONTAING SAME

(75) Inventors: Jianna Wang, Grafton, MA (US); Charles G. Herbert, Shrewsbury, MA (US)

(73) Assignees: Saint-Gobain Abrasives, Inc., Worcester, MA (US); Saint-Gobain Abrasifs, Conflans-Sainte-Honorine (FR)

( * ) Notice: Subject to any disclaimer, the term of this patent is extended or adjusted under 35 U.S.C. 154(b) by 369 days.

(21) Appl. No.: 13/537,927

(22) Filed: Jun. 29, 2012

(65) Prior Publication Data
US 2013/0014445 A1    Jan. 17, 2013

Related U.S. Application Data

(60) Provisional application No. 61/503,462, filed on Jun. 30, 2011.

(51) Int. Cl.
 *B24D 3/20* (2006.01)
 *B24D 3/34* (2006.01)
 *C09K 3/14* (2006.01)
(52) U.S. Cl.
 CPC .... *B24D 3/20* (2013.01); *B24D 3/344* (2013.01); *C09K 3/1436* (2013.01)
 USPC .......................................................... 51/307
(58) Field of Classification Search
 CPC ........ C09K 3/14; C09K 3/1436; B24D 11/00; B24D 3/34
 See application file for complete search history.

(56) References Cited

U.S. PATENT DOCUMENTS

| | | | |
|---|---|---|---|
| 4,047,903 A | | 9/1977 | Hesse et al. |
| 4,364,746 A | * | 12/1982 | Bitzer et al. ................... 51/298 |
| 4,526,938 A | | 7/1985 | Churchill et al. |
| 4,799,939 A | * | 1/1989 | Bloecher et al. ............... 51/293 |
| 5,342,659 A | | 8/1994 | Horowitz et al. |
| 5,422,387 A | | 6/1995 | Toms et al. |
| 6,797,023 B2 | | 9/2004 | Knapp et al. |
| 7,077,723 B2 | | 7/2006 | Bright et al. |
| 7,399,330 B2 | | 7/2008 | Schwabel et al. |

(Continued)

FOREIGN PATENT DOCUMENTS

| | | |
|---|---|---|
| CN | 1174868 A | 3/1998 |
| CN | 101733688 A | 6/2010 |
| EP | 2264115 A1 | 12/2010 |

OTHER PUBLICATIONS

PCT/US2012/044882, International Search Report mailed Jan. 31, 2013, 1 page.

(Continued)

*Primary Examiner* — Pegah Parvini
(74) *Attorney, Agent, or Firm* — Joseph P. Sullivan; Abel Law Group, LLP

(57) ABSTRACT

Abrasive aggregates and fixed abrasive articles comprising formaldehyde-free polymer binder and a plurality of abrasive grains are provided that are particularly suitable for machining operations, in which abrasion is carried out to remove material and improve surface quality. Certain embodiments combine an abrasive grain, which can be in the form of microparticles, and a formaldehyde-free polymer binder, which can be in the form of a polymer resin and cross-linking agent. Optionally, the abrasive aggregate can contain a secondary cross-linking agent, or a functional filler, such as a grinding aid.

16 Claims, 11 Drawing Sheets

(56) References Cited

U.S. PATENT DOCUMENTS

| | | | |
|---|---|---|---|
| 2002/0066233 A1 | 6/2002 | McArdle et al. | |
| 2003/0045213 A1* | 3/2003 | Keipert et al. | 451/57 |
| 2003/0194947 A1 | 10/2003 | Bright et al. | |
| 2004/0077295 A1 | 4/2004 | Hellring et al. | |
| 2008/0172951 A1* | 7/2008 | Starling | 51/308 |
| 2009/0197415 A1 | 8/2009 | Fujii et al. | |
| 2009/0252962 A1 | 10/2009 | Michl et al. | |
| 2010/0040832 A1 | 2/2010 | Herbert | |

OTHER PUBLICATIONS

BASF, The Chemical Company, "Fiber Bonding, Technical Data Sheet: Acrodur 950 L", Copyright BASF Corporation, 2009, 3 pages.

BASF, The Chemical Company, "Acrodur Acrylic Binder, Frequently Asked Questions", Accessed May 10, 2011, 2 pages <http://acrodur.info/faqs.html>.

SOLV, Inc., "Material Safely Data Sheet—Degree SGA +40 Emulsion", Date Prepared: Apr. 2010, 2 pages.

Crompton, OSi Specialties, "Silquest A-1100 Silane", Copyright 2002 Crompton Corporation, 4 pages.

BASF, The Chemical Company, "Acrodur Acrylic Binder, Product Portfolio", Accessed Jun. 16, 2011, Copyright 1998-2007 BASF Corporation, 1 page <http://www2.basf.us/AcrylicsDispersions/acrodur/acrodur-product-line.html>.

BASF, The Chemical Company, "Nonwovens", Accessed Jun. 16, 2011, Copyright 2001-2011 BASF SE, 2 pages <http://worldaccount.basf.com/wa/Eu~en_GB/Catalog/ACIndustry2/pi/BASF/subindustry . . . >.

* cited by examiner

COATED ABRASIVE AGGREGATES AND PRODUCTS CONTAING SAME

CROSS-REFERENCE TO RELATED APPLICATION(S)

The present application claims priority from U.S. Provisional Patent Application No. 61/503,462, filed Jun. 30, 2011, entitled "COATED ABRASIVE AGGREGATES AND PRODUCTS CONTAINING SAME," naming inventors Jianna Wang and Charles G. Herbert, which application is incorporated by reference herein in its entirety.

BACKGROUND

1. Field of the Disclosure

The present disclosure is generally directed to abrasive particulate material, methods for making abrasive particulate material, abrasive products incorporating abrasive particulate material, and methods for machining workpieces with abrasive particulate material.

2. Description of the Related Art

Abrasive products generally contain or are formed from abrasive particulate material. Such abrasive particulate material can be used as a free abrasive, such as in the form of a slurry, or a fixed abrasive, typically either a coated abrasive or a bonded abrasive article. Abrasive products are used in various industries to machine workpieces, such as by lapping, grinding, or polishing. Machining utilizing abrasive articles spans a wide industrial scope including metal fabrication industries. Machining, such as by hand or with use of commonly available tools such as orbital polishers (both random and fixed axis), and belt and vibratory sanders, is also commonly done by consumers in household applications. In each of these examples, abrasives are used to remove bulk material and/or affect surface characteristics of products (e.g., planarity, surface roughness).

Surface characteristics include shine, texture, and uniformity. For example, manufacturers of metal components use abrasive articles to fine polish surfaces, and oftentimes desire a uniformly smooth surface. Similarly, optics manufacturers desire abrasive articles that produce defect free surfaces to prevent light diffraction and scattering. Hence, the abrasive surface of the abrasive article generally influences surface quality.

Manufacturers also desire abrasive articles that have a high stock removal rate for certain applications. However, there is often a trade off between removal rate and surface quality. Finer grain abrasive articles typically produce smoother surfaces, yet have a lower stock removal rate. Lower stock removal rates lead to slower production and increased cost.

The surface characteristics and material removal rate can also be affected by the durability of the abrasive article. Abrasive articles that wear easily or lose grains can exhibit both a low material removal rate and can cause surface defects. Quick wear on the abrasive article can lead to a reduction in material removal rate, resulting in frequent exchanging of the abrasive article. Further, unwanted surface defects can lead to additional polishing steps. Both frequent exchanging of abrasive articles and additional polishing steps lead to slower production and increased waste associated with discarded abrasive articles.

Abrasive particle formation, such as through chemical synthesis routes or through bulk material processing routes (e.g., fusion and comminution), is considered a fairly well developed and mature art area. Accordingly, notable developmental resources have been dedicated to development of macrostructures, such as development of engineered abrasives products within the context of coated abrasives and particular three-dimensional structures and formulations in the context of bonded abrasives. Despite continued developments, a need continues to exist in the art for improved particulate material.

Abrasive particulate materials include essentially single phase inorganic materials, such as alumina, silicon carbide, silica, ceria, and harder, high performance superabrasive grains such as cubic boron nitride and diamond. Enhanced and even more sophisticated abrasive properties have been achieved through development of composite particulate materials. Such materials include formation of aggregates, which can be formed through slurry processing pathways that include removal of the liquid carrier through volatilization or evaporation, leaving behind green agglomerates, followed by high temperature treatment (i.e., firing) to form usable, fired agglomerates.

Additionally, certain aggregates relying on phenolic resin systems have been employed, but typical cross-linking agents release formaldehyde, which poses a risk to workers and is subject to greater environmental regulation.

Such composite agglomerates have found commercial use in various abrasive product deployments. However, the industry continues to demand even further improved particulate materials, and particularly composite aggregates that may offer enhanced machining performance.

SUMMARY

According to one embodiment, an aggregate forming mixture comprising about 80.0 to about 99.0 wt. % of a plurality of microparticle abrasive grains; and about 20.0 to about 1.0 wt. % of a formaldehyde-free polymer resin dispersion. The formaldehyde-free polymer resin dispersion can comprise a waterborne polymer resin dispersion, wherein the waterborne polymer resin dispersion has a solids content of at least about 20 wt. % to not greater than about 65% wt. %. The waterborne polymer resin dispersion can have a pH in the range of about 2.0 to about 11.

According to another embodiment, an aggregate forming mixture comprising: a plurality of microparticle abrasive grains; and a formaldehyde-free polymer resin dispersion, wherein the plurality of microparticle abrasive grains and the formaldehyde-free polymer resin dispersion are present according to a ratio in a range of not less than about 4:1 to not greater than about 99:1.

According to another embodiment, an aggregate forming mixture comprising a water-based polymer resin dispersion comprises a starch grafted resin. The starch grafted resin can comprise a starch grafted polystyrene resin. The mixture can further comprise a primary cross-linker selected from the group consisting of polyamidoamide epichlorohydrin, TACT triazine cross-linker, epoxy silanes, zirconium ammonium carbonate, glyoxal, blocked glyoxal, water dispersed blocked isocyanates, water dispersible epoxies, and water dispersible isocyanates.

In another embodiment, an aggregate forming mixture having a waterborne polymer resin dispersion comprising a modified polycarboxylic acid resin. The mixture further comprising a primary cross-linker that is an alcohol, wherein the alcohol is a polyhydric alcohol.

In another embodiment, an aggregate forming mixture further comprising: about 0.01 wt. % to about 0.15 wt. % of a secondary cross-linking agent. The secondary cross-linking agent can be an organosilane, an aminosilane, or an aminopropyltriethoxysilane.

In an embodiment, an aggregate precursor comprising: a mixture of about 80.0 wt. % to about 99.5 wt. % of a plurality of microparticle abrasive grains and about 20.0 to about 0.5 wt. % of a formaldehyde-free polymer resin, wherein the mixture is essentially free of water. The aggregate precursor is essentially free of water when it has less than 1.0 wt. % water.

According to another embodiment, an aggregate precursor comprising: a plurality of microparticle abrasive grains; and a formaldehyde-free polymer resin, wherein the plurality of microparticle abrasive grains and the formaldehyde-free polymer resin are present according to a ratio in a range of not less than about 4:1 to not greater than about 199:1.

In yet another embodiment, a cured aggregate comprising: about 95.0 to about 99.5 wt. % of a plurality of microparticle abrasive grains; and about 5.0 to about 0.5 wt. % of a formaldehyde-free polymer binder. The formaldehyde-free polymer binder can comprise a starch grafted binder, such as a starch grafted polystyrene binder. The starch grafted polystyrene binder can be the reaction product of cross-linking a starch grafted polystyrene resin with one of the group consisting of polyamidoamide epichlorohydrin, TACT triazine cross-linker, epoxy silanes, zirconium ammonium carbonate, glyoxal, blocked glyoxal, water dispersed blocked isocyanates, water dispersible epoxies, and water dispensable isocyanates. The starch grafted polystyrene binder can comprise one of a polyamidoamide group, a TACT triazyl group, a silyl group, a glyoxyl group, a blocked glyoxyl group, a blocked carbamate group, an alpha-hydroxy-alkoxy group, or a carbamate group.

In another embodiment, a cured aggregate having a formaldehyde-free polymer binder comprises a modified polycarboxylic acid binder. The modified polycarboxylic acid binder can be the reaction product of cross-linking a modified polycarboxylic acid resin with an alcohol. The modified polycarboxylic acid binder is an at least partially esterified polycarboxylic acid binder. The alcohol can be a polyhydric alcohol.

In another embodiment, a cured aggregate of any of the above further comprising: about 0.01 wt. % to about 0.15 wt. % of a secondary cross-linking agent. The secondary cross-linking agent can be an organosilane, an aminosilane, or an aminopropyltriethoxysilane.

In another embodiment, a cured aggregate, wherein the cured aggregate has a crush% of at least about 65%, at least about 60%, at least about 55%, at least about 45%, at least about 35%, or at least about 25%, wherein the crush% is measured at a load of 5 Mpa and a sieve mesh size of (−35/+45). The cured aggregate can also have a loose packed density of less than or equal to 1.2.

In another embodiment, a cured aggregate having an average size in a range not less than about 10 microns to not more than about 2500 microns. The cured aggregates can have microparticle abrasive grains having an average particle size in a range not less than about 30 microns to not greater than about 500 microns. The microparticle abrasive grains are one of the group consisting of oxides, carbides, nitrides, borides, oxynitrides, oxycarbides, diamond, and combinations thereof.

In another embodiment, a cured aggregate of any of the above, having a coating of an organosilane.

An abrasive article, comprising: a plurality of cured abrasive aggregates, wherein the cured abrasive aggregates comprise about 95.0 to about 99.0 wt. % of a plurality of microparticle abrasive grains and about 5.0 to about 1.0 wt. % of a formaldehyde-free polymer binder. The plurality of cured abrasive aggregates can be bonded to a substrate or fixed within a matrix material. The abrasive article can be a coated abrasive article or a bonded abrasive article.

According to another embodiment, An aggregate comprising: a plurality of microparticle abrasive grains; and a formaldehyde-free polymer binder, wherein the plurality of microparticle abrasive grains and the formaldehyde-free polymer binder are present according to a ratio in a range of not less than about 9:1 to not greater than about 199:1.

In another embodiment, an abrasive article having a cumulative cut rate greater than 110% that of a comparable abrasive article whose only difference is the presence of a phenolic resin binder in place of a formaldehyde-free polymer binder. The abrasive article having a grind ratio (G-ratio) greater than 110% that of a comparable abrasive article whose only difference is the presence of a phenolic resin binder in place of the formaldehyde-free polymer binder.

In another embodiment, a method of forming an abrasive aggregate, comprising: mixing together a plurality of abrasive grain particles, a waterborne formaldehyde-free polymer resin, and a primary cross-linking agent to form a mixture, and shaping the mixture to form an abrasive aggregate precursor. The method can further comprise during the mixing, adding a secondary cross-linking agent. The method can further comprise, during the mixing, adding a grinding aid. The method can further comprise curing the abrasive aggregate precursor to form an abrasive aggregate. The method can further comprise coating the abrasive aggregate with a layer of silane. The method of coating the cured abrasive grain with a layer of silane can comprises soaking the cured abrasive aggregate in an aqueous dispersion of organosilane that has been adjusted to a pH of about 6 to about 7.

In another embodiment, a method of forming an abrasive article comprising: binding a plurality of abrasive aggregates to a substrate, wherein the abrasive aggregates comprise about 90.0 to about 99.5 wt. % of a plurality of microparticle abrasive grains, and about 10.0 to about 0.5 wt. % of a formaldehyde-free polymer binder.

According to another embodiment, An abrasive article comprising: a plurality of cured abrasive aggregates, wherein the cured abrasive aggregates comprise a plurality of microparticle abrasive grains and a formaldehyde-free polymer binder, wherein the plurality of microparticle abrasive grains and the formaldehyde-free polymer binder are present according to a ratio in a range of not less than about 9:1 to not greater than about 199:1.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE PREFERRED EMBODIMENT(S)

According to an embodiment, abrasive aggregates and fixed abrasive articles comprising formaldehyde-free polymer binder are provided that are particularly suitable for machining operations, in which abrasion is carried out to remove material and improve surface quality. Certain embodiments combine an abrasive grain, which can be in the form of microparticles, and a formaldehyde-free polymer binder, which can be in the form of a polymer resin and cross-linking agent. Optionally, the abrasive aggregate can contain a secondary cross-linking agent, or a functional filler, such as a grinding aid.

The term "averaged," when referring to a value, is intended to mean an average, a geometric mean, or a median value.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation and radiation detection arts.

Figure 1:
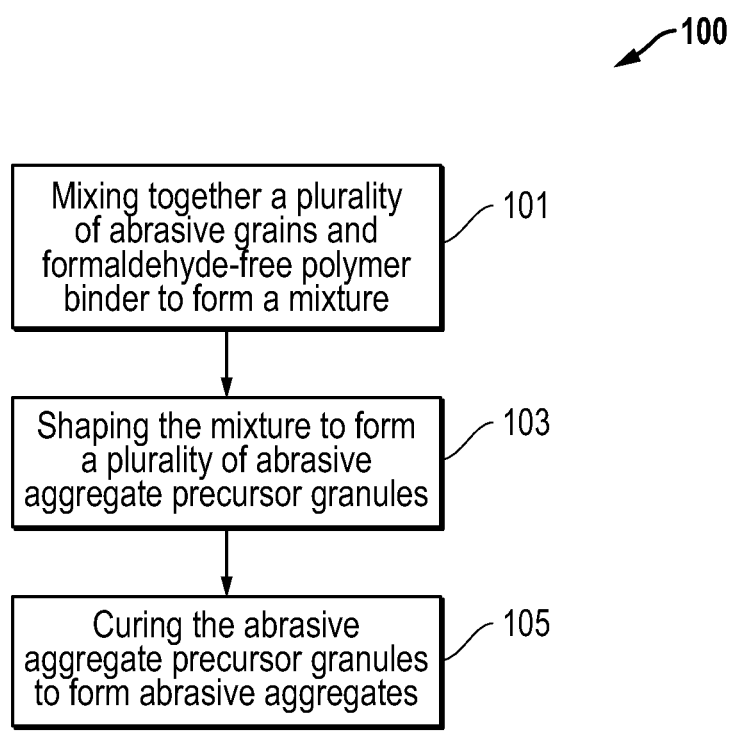
FIG. 1—is a flow diagram of a method of forming an aggregate according to the present disclosure.

FIG. 1 shows an embodiment of a method of forming an abrasive aggregate. As illustrated, the process comprises: mixing together a formaldehyde-free polymer binder and a plurality of abrasive grains to form a mixture (activity 101); shaping the mixture to form a plurality of abrasive aggregate precursor granules (activity 103); and curing the plurality of abrasive aggregate precursor granules to form abrasive aggregates (activity 105).

As used herein "polymer binder" encompasses a copolymer of at least two different chemicals, a "resin" and a "cross-linker", also called a "hardener", which undergo a polymerization reaction, or "curing", to form a cured binder, which is a cross-linked covalently bonded chemical moiety. It will be understood that reference to the binder includes the resin and cross-linker moieties prior to curing as well as the reaction product of the resin and cross-linker upon and after curing. Additionally, the binder may be obtained as a "one-part package" in which the binder is pre-mixed with the cross-linker and packaged as a one component system, or a "two-part package" in which the binder and cross-linker are not pre-mixed. Further, as used herein all references to a "polymer binder", "binder", or "binder material" are meant to be "formaldehyde-free" whether, such that the binder composition does not contain formaldehyde, or produce formaldehyde during curing.

In activity 101, the amount of formaldehyde-free polymer resin dispersion in the mixture, on an uncured, "wet" basis, which can include water content, can vary depending on the application. In an embodiment, the amount of formaldehyde-free polymer resin dispersion in the mixture is at least about 1.0 wt. % of the total mixture, at least about 1.5 wt. %, at least about 1.75 wt. %, at least about 2.0 wt. %, or at least about 2.25 wt. %. In another embodiment, the amount of formaldehyde-free polymer resin dispersion in the mixture is not greater than about 20 wt. %, not greater than about 15 wt. %, not greater than about 10 wt. %, not greater than about 8 wt. %, not greater than about 6.5, not greater than about 5.5 wt. %, or not greater than about 5 wt. %. The amount of the formaldehyde-free polymer resin dispersion in the mixture can be within a range comprising any pair of the previous upper and lower limits. In a particular embodiment the amount of the formaldehyde-free polymer resin dispersion in the mixture is in the range of about 2.0 wt. % to about 10.0 wt. %.

In an embodiment, the formaldehyde-free polymer binder comprises a waterborne polymer resin dispersion. The solids content of the waterborne polymer resin dispersion can vary depending upon the desired application. In an embodiment, the solids content of the waterborne polymer resin dispersion is at least about 20 wt. %, at least about 25 wt. %, at least about 30 wt. %, or at least about 35 wt. % of the total weight of the binder (resin plus cross-linker). In another embodiment, the solids content of the polymer resin dispersion is not greater than about 65 wt. % of the binder, not greater than about 60 wt. %, not greater than about 55 wt. %, not greater than about 50 wt. %. The solids content of the waterborne polymer resin dispersion can be within a range comprising any pair of the previous upper and lower limits. In a particular embodiment the solids content of the waterborne polymer resin dispersion is in the range of about 25 wt. % to about 50 wt. % of the binder. In another particular embodiment the solids content of the waterborne polymer resin dispersion is in the range of about 35 wt. % to about 60 wt. % of the binder.

Similarly, depending upon the desired application, the waterborne polymer resin dispersion can vary in pH. In an embodiment, the pH is at least about 2.0, at least about 2.5, at least about 3.0, at least about 3.5, at least about 4.5, at least about 7.5, or at least about 8.0. In another embodiment, the pH is not greater than about 11.0, not greater than about 10.5, not greater than about 10, not greater than about 9.5, not greater than about 6.5, not greater than about 6.0, or not greater than about 5.5. The pH of the waterborne polymer resin dispersion can be within a range comprising any pair of the previous upper and lower limits. In a particular embodiment the pH of the waterborne polymer resin dispersion is in the range of about 2.5 to about 10.5. In another particular embodiment the pH of the waterborne polymer resin dispersion is in the range of about 2.5 to about 5.5. In another particular embodiment the pH of the waterborne polymer resin dispersion is in the range of about 8.0 to about 10.0.

The formaldehyde-free waterborne polymer resin dispersion can be a thermally curable binder material, or alternatively, can be a radiation curable binder material.

According to one embodiment, the formaldehyde-free polymer waterborne polymer resin dispersion can include a polymer material selected from the group consisting of acrylic binder, styrene acrylonitrile binder, styrene butadiene rubber binder, polyvinyl acetate binder, vinyl acrylic binder, polyurethane binder, starch grafted styrene acrylate, acrylic modified polyvinyl acetate, and combinations thereof.

According to another embodiment, the formaldehyde-free waterborne polymer resin dispersion can include a polyvinyl acetate, an acrylate, a starch, and combinations thereof. For example, the formaldehyde-free waterborne polymer resin dispersion can include a starch grafted resin, such as a starch grafted polystyrene resin, such as a hydrophobic styrene acrylate grafted to a starch. Notably, such a binder has a neutral to slightly basic pH (about a pH of 8-10), which poses less risk of corrosion to production line equipment over time. Further, the lower pH allows a broader range of additives and cross-linking chemistries that would not otherwise be stable at low pH. Additionally, the starch grafted polystyrene based chemistry cures at lower temperatures as compared to glass bond chemistries, which potentially allows for lower production costs and increased throughput.

Cross-linking agents for the preceding starch grafted polystyrene chemistry include reagents that effectively cross-link polyol functionality, such as TACT triazine cross-linker (e.g., Cylink 2000, Cytec), epoxy silanes (e.g., Coat-O-1770, GE Silicones), zirconium ammonium carbonate (e.g., Eka AZC 5880LN, Eka), glyoxal (e.g., Eka RC5550, Eka), water dispersed blocked isocyanates (e.g., API-BI792, Advanced Polymer Inc.), water dispersible epoxies (e.g., API-EC11, Advanced Polymer Inc.), water dispersible isocyanates (Desmodur DA-L, Bayer), and polyamidoamide epichlorohydrin (Kymene® 557 H, Hercules).

In a preferred embodiment, the formaldehyde-free polymer dispersion is DegreeSGA+40, an aqueous thermosetting dispersion containing an acrylic grafted starch (starch grafted acrylic polystyrene) and the crosslinking agent is Degree+27, a blocked glyoxal composition, both commercially available from Solv, Inc., Rock Hill, S.C.

Also, reactive hydrophobic additives compatible with the starch grafted polystyrene chemistry can be added, including epoxidized fatty acids (soybean oil, grapeseed oil, linseed oil, etc.), polyethylene acrylic acids (Michem Prime, Michelman), stearylated acrylates (Aquesize 914, Solv), emulsified asphalt or coal tar based resins, hydrophobic acrylics (Lubritan S P, Rohm and Haas), maleated PE waxes, maleated PP waxes, or combinations thereof.

In another particular embodiment, the waterborne polymer resin dispersion can include a polycarboxy polymer that is an organic polymer or oligomer that contains more than one pendant carboxy group. The polycarboxy polymer can be a homopolymer or copolymer prepared from unsaturated carboxylic acids including, but not limited to, acrylic acid, methacrylic acid, crotonic acid, isocrotonic acid, maleic acid, cinnamic acid, 2-methylmaleic acid, itaconic acid, 2-mefhylitaconic acid, a, (3-methyleneglutaric acid, fumaric acid, monoalkyl maleates, monoalkyl fumarates, their corresponding alkali metal and ammonium salts, and combinations thereof. Alternatively, the polycarboxy polymer may be prepared from unsaturated anhydrides such as maleic anhydride, itaconic anhydride, acrylic anhydride, methacrylic anhydride, and mixtures thereof. Methods for polymerizing these acids and anhydrides would be understood by one of ordinary skill in the art. The polycarboxy polymer may be present at a concentration of from about 1-50% by weight based on the total weight of the resin dispersion.

In addition, the polycarboxy polymer may include a copolymer of one or more of the unsaturated carboxylic acids or anhydrides described above and one or more vinyl compounds including, but not limited to, styrene, a-methylstyrene, acrylonitrile, methacrylonitrile, methyl acrylate, ethyl acrylate, n-butyl acrylate, isobutyl acrylate, methyl methacrylate, n-butyl methacrylate, isobutyl methacrylate, glycidyl methacrylate, methyl vinyl ether, ethyl vinyl ether, propyl vinyl ether, isobutyl vinyl ether, 2-ethylhexyl vinyl ether, vinyl cyclohexyl ether, and vinyl acetate. Other suitable copolymers include, but are not necessarily limited to, a-olefins, (e.g. ethene, propene, butene, isobutene, pentene, cyclopentene, hexene, and cyclohexene), C8-C12-olefins (e.g., 1-dodecene), C14-C18-olefins (e.g., octadecene), C20-C24- olefins (e.g., 1-eicosene), acrylamides and substituted acrylamides (e.g., acrylamide, methacrylamide, and N-tertbutylacrylamide), sulfo-containing monomers (e.g., allylsulfonic acid, methallylsulfonic acid, and 2-acrylamido-2-methylpropanesulfonic acid), and butadiene. Methods for preparing these copolymers would be understood by those ordinarily skilled in the art.

Crosslinking agents suitable for use with the polycarboxy polymer resin include polyols that contain at least two hydroxyl groups, such as, for example, glycerol, trimethylolpropane, trimefhylolefhane, diethanolamine, triethanolamine, 1,2,4-butanetriol, ethylene glycol, glycerol, pentaerythritol, sorbitol, sucrose, glucose, resorcinol, catechol, pyrogallol, 1,3-propanediol, 1,4-butanediol, 1,6-hexanediol, 1,4-cyclohexane diol, 2-butene-1, erythritol, pentaerythritol, sorbitol, (3-hydroxyalkylamides, trimethylol propane, glycolated ureas, and mixtures thereof. A preferred crosslinking agent is triethanolamine or glycerol.

The ratio of polycarboxy polymer to crosslinking agent may be determined by comparing the ratio of moles of hydroxyl groups contained in the polyol crosslinking agent to moles of carboxy groups contained in the polycarboxylic acid polymer. This stoichiometric ratio may vary over wide limits. The molar ratio of carboxylic acid groups from the polycarboxylic acid to the hydroxyl groups of the crosslinking agent may be from 1:3 to 5:1, preferably from 1:1 to 3:1. An excess of equivalents of carboxylic acid groups to the equivalents of hydroxyl groups is preferred.

In a preferred embodiment, the formaldehyde-free polymer dispersion is Acrodur 950 L (formerly Acronal DS 2348), an aqueous thermosetting binder composition containing a modified polycarboxylic acid and a polyfunctional alcohol as a crosslinking agent, commercially available from BASF Corp. Acrodure 950 L has an approximate pH in the range of about 3.0 to about 4.0.

Turning back to activity 101, the amount of the plurality of microparticle abrasive grains in the mixture can vary depending on the application. In an embodiment, amount of the plurality of microparticle abrasive grains in the mixture is at least about 80.0 wt. % of the total mixture, at least about 85 wt. %, at least about 87.5 wt. %, at least about 90 wt. %. In another embodiment, the amount of the plurality of microparticle abrasive grains in the mixture is not greater than about 99 wt. %, not greater than about 98 wt. %, not greater than about 97 wt. %, not greater than about 96 wt. %, not greater than about 95 wt. %, not greater than about 94 wt. %, or not greater than about 93 wt. %. The amount of the plurality of microparticle abrasive grains in the mixture can be within a range comprising any pair of the previous upper and lower limits. In a particular embodiment the amount of the plurality of microparticle abrasive grains in the mixture is in the range of about 90 wt. % to about 98 wt. %.

As used herein, the term "microparticle" is used to refer to a particle having an average particle size of from about 0.2 microns to about 750 microns, preferably not less than 0.2 microns, 0.5 microns, 1.0 microns, 5 microns, or 10 microns, and not greater than about 750 microns, not greater than 500 microns, not greater than about 250 microns, or not greater than about 200 microns. The average particle size of the microparticle abrasive grains can be within a range comprising any pair of the previous upper and lower limits. Particular embodiments have an average particle size from about 0.5 microns to about 150 microns.

As used herein, the term "nanoparticle" is used to refer to a particle having an average particle size of from about 5 nm to about 150 nm, typically less than about 100 nm, 80 nm, 60 nm, 50 nm, or less than about 40 nm. Typical average particle sizes of nanoparticles lie within a range of about 20 nm to about 50 nm.

The abrasive grains generally have a Mohs hardness of greater than about 3, and preferably from about 3 to about 10. For particular applications, the abrasive grains have a Mohs hardness not less than 5, 6, 7, 8, or 9. The abrasive grains are generally believed to serve as the primary active grinding or polishing agent in the abrasive aggregates. Examples of suitable abrasive compositions include non-metallic, inorganic solids such as carbides, oxides, nitrides and certain carbonaceous materials. Oxides include silicon oxide (such as quartz, cristobalite and glassy forms), cerium oxide, zirconium oxide, aluminum oxide. Carbides and nitrides include, but are not limited to, silicon carbide, aluminum, boron nitride (including cubic boron nitride), titanium carbide, titanium nitride, silicon nitride. Carbonaceous materials include diamond, which broadly includes synthetic diamond, diamond-like carbon, and related carbonaceous materials such as fullerite and aggregate diamond nanorods. Materials may also include a wide range of naturally occurring mined minerals, such as garnet, cristobalite, quartz, corundum, feldspar, by way of example. Certain embodiments of the present disclosure, take advantage of diamond, silicon carbide, aluminum oxide, and/or cerium oxide materials. In addition, those of skill will appreciate that various other compositions possessing the desired hardness characteristics may be used as abrasive grain particles in the abrasive aggregates of the present disclosure. In addition, in certain embodiments according to the present disclosure, mixtures of two or more different abrasive grains can be used in the same aggregate or in mixtures of aggregates.

Turning now to activity 103, shaping of the mixture to form a plurality of abrasive aggregate precursor granules may be accomplished by any means suitable for shaping a wet mixture into granules, including shaping by screening, pressing, sieving, extruding, segmenting, casting, stamping, cutting, or a combination thereof. In particular, the wet mixture may be shaped into the abrasive aggregate precursor granules by pushing, or otherwise moving, the wet mixture through a sieve or screen.

During the preceding activities 101 and 103, the compositions of the wet aggregate forming mixture and the abrasive aggregate precursor granules, before any curing or drying occurs, are generally the same, and comprise about 80 wt. % to about 99 wt. % of a plurality of microparticle abrasive grains and about 20 wt. % to about 1.0 wt. % of formaldehyde-free polymer resin dispersion. In another embodiment, the aggregate forming mixture and the abrasive aggregate precursor granules comprises about 90 wt. % to about 99 wt. % of a plurality of microparticle abrasive grains and about 10 wt. % to about 1.0 wt. % of formaldehyde-free polymer resin dispersion. In yet another embodiment, the aggregate forming mixture and the abrasive aggregate precursor granules comprises about 93 wt. % to about 99 wt. % of a plurality of microparticle abrasive grains and about 7.0 wt. % to about 1.0 wt. % of formaldehyde-free polymer resin dispersion.

The aggregate forming mixture, and therefore the aggregate precursor granules, may also include any of various fillers, functional or non-functional, so long as a proper ratio is maintained between the amount of microparticle abrasive grains and the formaldehyde-free polymer resin dispersion. The ratio of the amount of microparticle abrasive grains to the amount of formaldehyde-free polymer resin dispersion is at least about 4:1, at least about 4.5:1, at least about 5:1, or at least about 5.6:1. In another embodiment, the ratio of the amount of microparticle abrasive grains to the amount of formaldehyde-free polymer resin dispersion is not greater than about 199:1, not greater than about 99:1, not greater than about 49:1, or not greater than about 32:1. The ratio of the amount of microparticle abrasive grains to the amount of formaldehyde-free polymer resin dispersion can be within a range comprising any pair of the previous upper and lower limits. In a particular embodiment the ratio of the amount of microparticle abrasive grains to the amount of formaldehyde-free polymer resin dispersion is in the range of about 4:1 to about 199:1.

In activity 105, the process continues by curing the abrasive aggregate precursor to form an abrasive aggregate. As used herein, the term "aggregate" is used to refer to a particle made of a plurality of smaller particles that have been combined in such a manner that it is relatively difficult to separate or disintegrate the aggregate particle into smaller particles by the application of pressure or hand agitation. This is in contrast to the term "agglomerate", which will be used herein to refer to a particle made of a plurality of smaller particles which have been combined in such a manner that it is relatively easy to separate the agglomerate particle or disintegrate the particle back into the smaller particles, such as by the application of pressure or hand agitation. According to present embodiments, the aggregates have a composite structure, including abrasive grains that have a size within the microparticle range, a formaldehyde-free polymer binder in which the abrasive grains are embedded or contained.

It will be appreciated that curing of the abrasive aggregate precursor can include curing processes known in the art, including for example exposure to radiation, thermal curing, or exposure to particular reactants. The curing process can facilitate solidification of the binder material and removal of water from the abrasive aggregate precursor. Curing methods include heating by exposure to infrared (IR) radiation, such as on an IR table, heating in an oven, or heating in a rotary kiln.

According to one embodiment, the process of curing the abrasive aggregate precursor includes exposing the abrasive aggregate precursor to elevated temperatures for a particular duration. For example, the abrasive aggregate precursor can be exposed to temperatures of at least 50° C., such as at least about 75° C., at least about 100° C., or even at least about 115° C. In other instances, the abrasive aggregate precursor can be exposed to temperatures of less than about 300° C., such as less than about 250° C., less than about 200° C., less than about 190° C., or even less than 185° C. It will be appreciated that the temperature can be within a range between any of the minimum and maximum values noted above. In a particular embodiment the curing temperature is in a range of at least about 100° C. to less than about 185° C.

The duration of curing of the abrasive aggregate precursor granules can be at least about 10 minutes, such as at least about 25 minutes, at least about 30 minutes, at least about 50 minutes, at least about 60 minutes, or even longer. Generally, the process of curing does not last for a duration of longer than about 4 hours, such as not greater than about 3 hours, or not greater than about 2 hours. It will be appreciated that the duration of curing can be within a range between any of the minimum and maximum values noted above. In a particular embodiment the curing duration is in a range of at least about 30 minutes to less than about 1.5 hours. One of skill in the art will recognize that heating time generally varies depending on heating temperature such that when the heating temperature is higher, the heating time can be shorter and vice versa.

In general, after curing, the abrasive aggregate comprises about 90 wt. % to about 99.5 wt. % of a plurality of microparticle abrasive grains and about 10 wt. % to about 0.5 wt. % of formaldehyde-free polymer resin binder. In another embodiment, the aggregate forming mixture and the abrasive aggregate precursor granules comprises about 95 wt. % to about 99.5 wt. % of a plurality of microparticle abrasive grains and about 5 wt. % to about 0.5 wt. % of formaldehyde-free polymer binder. In yet another embodiment, the aggregate forming mixture and the abrasive aggregate precursor granules comprises about 96 wt. % to about 99.5 wt. % of a plurality of microparticle abrasive grains and about 4.0 wt. % to about 0.5 wt. % of formaldehyde-free polymer binder.

The aggregate may also include any of various fillers, functional or non-functional, so long as a proper ratio is maintained between the amount of microparticle abrasive grains and the formaldehyde-free polymer binder. The ratio of the amount of microparticle abrasive grains to the amount of formaldehyde-free polymer binder is at least about 9:1, at least about 10:1, at least about 11:1, at least about 13:1, or at least about 15:1. In another embodiment, the ratio of the amount of microparticle abrasive grains to the amount of formaldehyde-free polymer binder is not greater than about 199:1, not greater than about 132:1, or not greater than about 99:1. The ratio of the amount of microparticle abrasive grains to the amount of formaldehyde-free polymer binder can be within a range comprising any pair of the previous upper and lower limits. In a particular embodiment the ratio of the amount of microparticle abrasive grains to the amount of formaldehyde-free polymer binder is in the range of about 4:1 to about 199:1.

After suitably curing the abrasive aggregate precursor at activity 105, though not required, further processing can be undertaken. For example, a sorting process can be undertaken to remove aggregates of unwanted sizes or to isolate aggregates of desired sizes. It will be appreciated that suitable means for sorting of the particles can include using sieves to gather abrasive aggregates of a desired size distribution.

As mentioned above, once formed, the abrasive aggregates may be classified, or separated into various size ranges as desired before being applied to a substrate or otherwise utilized in a polishing operation. In addition to the abrasive aggregates, a resultant powder may include an amount of material smaller than the desired aggregate size. The particulate material composed of the thus formed aggregates generally has an average particle size within a range of about 10 to about 2500 microns. Typically, the aggregate has an average particle size not less than about 10 microns, not less than about 20 microns, not less than about 30 microns, or not less than about 50 microns, not less than 100 microns, not less than 200 microns. Upper limits for average particle size are driven by particular end use applications and generally the abrasive aggregate average particle size is not greater than about 2500 microns, not greater than about 1500 microns, not greater than about 1000 microns, not greater than about 900 microns, or even not greater than 850 microns. It will be appreciated that the average aggregate particle size can be within a range between any of the minimum and maximum values noted above. In certain embodiments, the average particle size of the abrasive aggregates is between about 20 microns and 100 microns, between about 100 microns and 425 microns, or between about 200 microns and 800 microns. The size, and the size range, of the aggregates may be adjusted and may depend on many factors, including the composition of the mixture and the granulation method.

Figure 2:
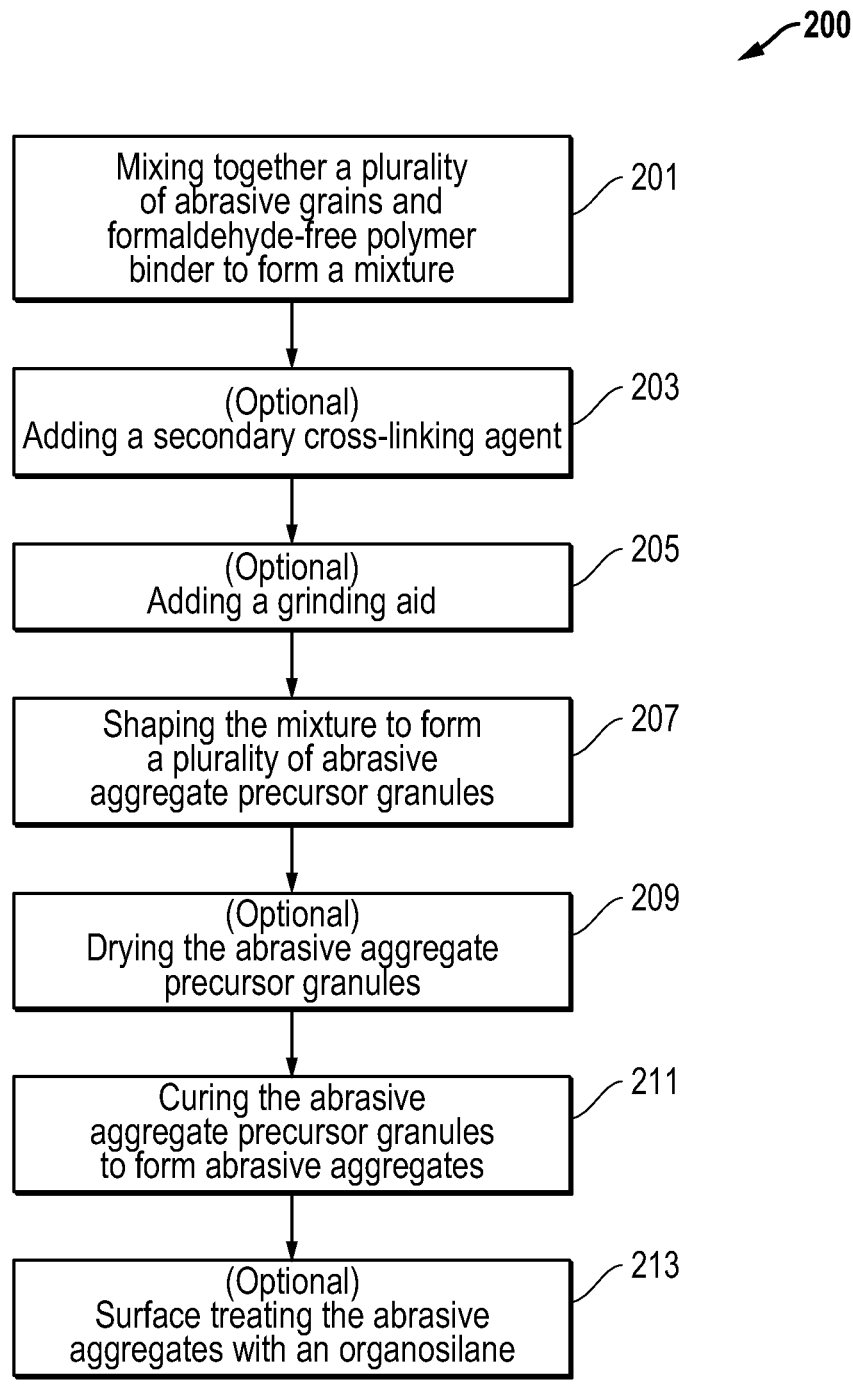
FIG. 2—is a flow diagram of another method of forming an aggregate according to the present disclosure.

Turning now to FIG. 2, shown is another embodiment of a method 200 of forming an abrasive aggregate that includes: mixing together a formaldehyde-free polymer binder and a plurality of abrasive grains to form a mixture (activity 201); optionally, adding a secondary cross-linking agent to the mixture (activity 203); optionally, adding a grinding aid to the mixture (activity 205); shaping the mixture to form a plurality of aggregate precursor granules (activity 207); optionally, drying the plurality of aggregate precursor granules (activity 209); curing the plurality of aggregate precursor granules to form an abrasive aggregates (activity 211); and optionally, coating the surface of the abrasive aggregates with an organosilane (activity 213).

During activity 201, the mixing together a formaldehyde-free polymer binder and a plurality of abrasive grains to form a mixture is conducted as previously described above in relation to FIG. 1.

Although optional, during activity 203, adding a secondary cross-linking agent to the mixture can occur. A secondary cross-linking agent can advantageously be included in the mixture for forming the aggregates. Applicants discovered that aggregates could be strengthened by the addition of a secondary cross-linking agent to the mixture for forming the aggregate.

Suitable secondary cross-linking agents include organosilanes. In an embodiment, the organosilane is an aminosilane. In a particular embodiment, the aminosilane is an aminopropyltriethoxysilane.

The concentration of secondary cross-linking agent in the mixture, may vary depending on the desired application. In an embodiment, the concentration of secondary cross-linking agent in the mixture is at least about 0.05 wt. % of the total mixture, at least about 0.075 wt. %, or at least about 0.085 wt. %. In another embodiment, the amount of the secondary cross-linking agent in the mixture is not greater than about 0.15 wt. %, not greater than about 0.125 wt. %, or not greater than about 1.1 wt. %. The amount of the secondary cross-linking agent in the mixture can be within a range comprising any pair of the previous upper and lower limits. In a particular embodiment the amount of the secondary cross-linking agent in the mixture is in the range of about 0.05 wt. % to about 0.15 wt. %. In another embodiment, the concentration of secondary cross-linking agent in the mixture can be between 0.075 wt. % and about 0.125 wt. %.

Although optional, during activity 205, adding a grinding aid to the mixture can occur. Particular grinding aid materials can include wollastonite, calcium difluoride, calcium carbonate, aluminum anhydride, cryolite, potassium borofluoride, combinations thereof, and the like. The choice of grinding aid will be influenced by the pH of the binder material. For example, potassium borofluoride is not compatible with acidic pH mixtures, whereas cryolite is compatible with both acidic and neutral to basic mixtures. The concentration of grinding aid in the mixture can be in the range of about 3.5 wt. % to about 5.5 wt. %.

During activity 207, shaping the mixture to form a plurality of aggregate precursor granules is conducted as previously described above in relation to FIG. 1.

Although optional, during activity 209, drying the plurality of aggregate precursor granules can occur. Drying can be performed at temperatures below the curing temperature, such as at ambient temperature, to remove water from the mixture but leave the aggregate precursor granules uncured. Dried aggregate precursor granules can be stored for later usage. The dried aggregate precursor granules may then be cured prior to being used or incorporated into a fixed abrasive article, or alternatively may be incorporated into a fixed abrasive article wherein curing of the aggregate precursor granule will occur sometime during the heating steps associated with preparing the fixed abrasive article. The composition of a dried aggregate precursor granule is the same as for the aggregate forming mixture, as described above in relation to FIG. 1, because the binder components (resin and cross-linker) have not yet been reacted to cure the binder; however, the water from the resin dispersion has been removed by the drying process. It will be recognized that achieving absolute removal of all water moisture from the aggregate precursor granules is difficult, if not impossible due to the presence of naturally occurring water vapor in ambient air. It is preferable that the aggregate precursor granules be dried until essentially free of water, such as so that the aggregate precursor granules have less than 1 wt. % of water content.

In an embodiment the dried aggregate precursor granules may also include any of various fillers, functional or non-functional, so long as a proper ratio is maintained between the amount of microparticle abrasive grains and the formaldehyde-free polymer resin. The ratio of the amount of microparticle abrasive grains to the amount of formaldehyde-free polymer resin is at least about 4:1, at least about 9:1, at least about 11:1, at least about 13:1, or at least about 15:1. In another embodiment, the ratio of the amount of microparticle abrasive grains to the amount of formaldehyde-free polymer resin is not greater than about 199:1, not greater than about 132:1, or not greater than about 99:1. The ratio of the amount of microparticle abrasive grains to the amount of formaldehyde-free polymer resin can be within a range comprising any pair of the previous upper and lower limits. In a particular embodiment the ratio of the amount of microparticle abrasive grains to the amount of formaldehyde-free polymer resin is in the range of about 4:1 to about 199:1.

During activity 211, curing the plurality of aggregate precursor granules to form abrasive aggregates is conducted as previously described above in relation to FIG. 1.

Although optional, during activity 213, coating the surface of the abrasive aggregates with an organosilane can occur. The surface of the abrasive aggregates can be surface treated so as to form a silane coating on the outer surface of the aggregates. Typical silane coating includes organosilanes, aminosilanes, and mixtures thereof. In a particular embodiment, the silane is an aminopropyltriethoxysilane.

Coating the surface of the abrasive aggregate with an organosilane can be accomplished by soaking a cured abrasive aggregate in an aqueous solution of silane for a specified period of time, such as about half an hour. In an embodiment, a suitable aqueous solution of organosilane comprises 3.5 grams of aminosilane per 100 grams of water. The solution can surface treat up to 10 pounds of abrasive aggregate. The solution can be prepared by adding the aminosilane drop by drop to the water while monitoring and maintaining the pH in a range of 6 to 7, such as by the addition of glacial acetic acid. The solution is mixed for a period of time sufficient to activate the silane and allow the solution to become non-hazy, such as about 1.5 to 3 hours. After soaking the abrasive aggregate, the liquid is decanted and the aggregate is allowed to air dry for a period of time, such as overnight.

In one embodiment according to the present disclosure, abrasive aggregates may be formed using a single size of abrasive grain, the size of the grain and the resultant aggregates both being tailored to the desired polishing application. In other embodiments, mixtures of two or more differently sized abrasive grains may be used in combination to form abrasive aggregates having advantageous characteristics attributable to each of the grain particle sizes.

In particular, no step is carried out in which the aggregate materials are heated to temperatures above 500° C. Thus, in certain embodiments according to the present disclosure, all of the steps of the method of making the aggregates may be carried at temperatures of about 400° C. or less.

This stands in contrast to conventional processes for making abrasive aggregates that rely on vitreous binders that typically require sintering at high temperatures of about 500° C. to 1000° C. or more.

Once produced, the abrasive aggregates may be used directly as a loose or 'free' abrasive powder. In this context, the abrasive powder formed from the aggregates may be used as either a dry powder or a powder which has been wetted with a liquid such as water to create a slurry for improved performance. The abrasive powder may also be incorporated into a polishing paste or gel. The abrasive powder so produced may advantageously be used for the finishing and/or polishing of numerous other materials. Alternatively, the aggregates can be configured into a fixed abrasive article, a term that broadly includes coated abrasive products and bonded abrasive products.

In other embodiments of the present disclosure, however, the abrasive aggregates are preferably combined with a resin material used to adhere the aggregates onto a surface of a substrate. Processes for combining the aggregates with the resin bonding material include slurry formation, in which the aggregates, resin and other additives are combined together and coated on a substrate, or in a distinct processing pathway, aggregates are placed on a resin coated substrate through electrostatic attraction or simply through gravity (e.g., sprinkled on the substrate). The latter approach is well understood in the art, generally first depositing a 'make coat' on the substrate, aggregate application on the make coat, and subsequent deposition of a 'size coat.' Optionally, a supersize coat may be deposited over the size coat. Further, a compliant coat may be disposed between the make coat and the substrate. In another example, a back coat may be disposed over the substrate on a side opposite the make coat.

In connection with electrostatic deposition of the aggregate to the make coat of a substrate, suitable polymeric resin materials may include polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof. A preferred resin is an epoxy resin. The make coat may additionally comprise other ingredients to form a binder system designed to bond the aggregate grains onto a substrate. Other optional ingredients, such as solvents, defoamers, dispersants, and pigments may be added to the make coat.

The make coat is preferably applied to the substrate using a blade spreader to form a coating. Alternatively, the make coat may be applied using slot die, gravure, or reverse gravure coating methods. The coating thickness may range from about 1 to about 5 mils in thickness, after drying. The make coat may be allowed to partially dry or may be completely wet when the substrate is passed coated side down through an electrostatic deposition station at a desired speed. Aggregates can be applied either by gravity coating (i.e., allowing the aggregates to fall onto the wet backing) or by electrostatic projection. During electrostatic deposition, the aggregates are adhered upwardly into the make coat through the application of opposite electric charges to aggregates and the coated substrate. Generally, gravity coating is preferred due to ease and electrical energy savings.

In particular embodiments, the make coat may be applied to the substrate at rates of about 0.5 to about 10 pounds per ream (330 sq. ft.). Similarly, aggregate may be applied at a rate of about 0.5 to about 10 pounds per ream.

Depending on the coating type, the substrate may be heated in order to cure the resin and bond the aggregate grains to the substrate. In particular embodiments, the coated substrate is heated to a temperature of between about 100° C. to less than about 250° C. during this curing process. In certain embodiments of the present disclosure, it is preferred that the curing step be carried at a temperature of less than about 200° C.

Once the resin is cured and the aggregate abrasive grains are bonded to the substrate, the coated substrate is substantially finished and may be used for a variety of stock removal, finishing, and polishing applications.

In an alternative embodiment of the present disclosure, the abrasive aggregates may be directly incorporated into the substrate. For instance, the aggregates may be mixed a polyester resin and this mixture of aggregates and polymer may then be formed into a substrate.

In an alternative embodiment of the present disclosure, the abrasive aggregates could be applied to substrates or other materials by electric-static, spray coating, and spray powder coating methods.

The abrasive-coated substrate may them be used as a lapping film or a micro-finishing film for finishing and/or polishing other materials. Substrate materials which may be coated in this manner include, but are not limited to, polyester, polyurethane, polypropylene, polyimides such as KAPTON from DuPont, non-woven materials, woven materials, paper, and metals including foils of copper, aluminum, and steel. Polyester films are particularly preferred as the substrate material is certain embodiments of the present disclosure. Suitable substrates may have a thickness, before being coated, of from about 1 to about 14 mils.

Further, the abrasive aggregates may also be incorporated into bonded abrasives, such as diamond grinding wheels and other grinding wheels. Bonded abrasives may also used to provide high traction, non-slip materials which may be applied, for example, to ladder rungs. Here, typically bonded abrasives are three dimensional structures rather than the generally planar structure of a coated abrasive, and includes a 3-dimensional matrix of bonding material in which the aggregates are embedded. That is, the bond material fixes position of the aggregates with respect to each other, and is present as an inter-agglomerate phase. While bonded abrasives utilize a wide variety of bonding agents, such as resin, glass, and metals, certain agents such as glass and metal bond materials require high temperature processing. Accordingly, to preserve the aggregates, generally resin systems are used that do not require high cure temperatures, or which can be cured with actinic radiation such as UV.

In another embodiment according to the present disclosure, the abrasive product may be used for stock removal, finishing and polishing of hard metal surfaces such as steel. When used for polishing hard metal surfaces, the abrasive substrate films are preferably produced from aggregates formed from diamond or silicon carbide grain. The grain particles preferably have a size of about 1 micron, and the overall size of the aggregates is preferably from about 30 to about 80 microns. These aggregates are preferably bonded to a polyester film substrate. Using this abrasive product, polishing of the surfaces may be carried out, for example, using a Struers metal polishing machine (available from Struers, Inc. of Westlake, Ohio) operating at a speed of 600 rpm and with an applied force of 15 newtons.

In another embodiment according to the present disclosure, the abrasive product may be used for stock removal, finishing and polishing of softer metal surfaces such as copper or brass. When used for polishing softer metal surfaces, the abrasive substrate films are preferably produced from aggregates formed from diamond or silicon carbide grain. The grain particles preferably have a size of about 3 to 5 microns, and the overall size of the aggregates is preferably from about 30 to about 80 microns. These aggregates are preferably bonded to polyester film substrate. Using this abrasive product, polishing of the surfaces may be carried out, for example, using a Struers metal polishing machine (available from Struers, Inc. of Westlake, Ohio) operating at a speed of 150 rpm and with an applied force of 45 newtons. Alternatively, soft metal surfaces may also be polished using abrasive aggregates formed from silicon carbide grain combined with silica.

The average roughness, or $R_a$, of a surface is a measure of the degree of variations in the overall height profile of a surface. A lower roughness value is generally indicative of a surface which is smoother and has smaller variations in overall height between differing locations on the surface.

Typically the polishing of materials, such as those described above, is carried out in a multi-step, incremental process. The surface is first polished with a relatively coarse abrasive material and then polished again with a somewhat finer grain abrasive material. This process may be repeated several times, which each successive re-polishing being carried out with a progressively finer grain abrasive until the surface is polished to the desired degree of smoothness. This type of multi-step polishing procedure has conventionally been required as typically the grains of an abrasive must be on the same scale as the size of the scratches which they are to remove. Certain polishing protocols use successively finer products having a grain size, and attendant Ra (with respect to both the abrasive product and on the workpiece post-machining step) reduced by a factor of three. That is, successively finer products are generally limited to reduction by a factor of three (e.g., from 9 micron, to 6 micron, to 3 micron grain sizes), in order to ensure defect removal from the preceding machining step.

Although there is usually an expected trade-off between material removal rate and surface quality, as shown in the figures and further described in the Examples, the inventors have unexpectedly discovered that the cumulative material removal rate of coated abrasive products produced according to present disclosure can exceed currently available abrasive products that incorporate glass bond and phenolic bond aggregates without negatively affecting the surface quality of abraded surfaces to any great extent.

The properties and advantage of the present disclosure are illustrated in further detail in the following nonlimiting examples. Unless otherwise indicated, temperatures are expressed in degrees Celsius, and concentrations are expressed in weight percentages based upon the overall dry weight of the abrasive aggregates.

Listing of Components

Acrodure 950L—An aqueous formaldehyde-free modified polycarboxylic acid dispersion with a polyhydric crosslinking agent (BASF Corp., Dispersions and Pigments, Charlotte, N.C.), solids content approximately 48%, pH=3.2.

DegreeSGA+27—Blocked glyoxal crosslinking agent (Solv, Inc., Rock Hill, S.C.).

DegreeSGA+40—An aqueous formaldehyde-free modified starch grafted polystyrene dispersion (Solv, Inc., Rock Hill, S.C.), solids content approximately 37%, pH=9.

KBF4—Potassium tetrafluoroborate (generally available, CAS No. 14075-53-7) (Washington Mills Electro Minerals Corp., Niagara Falls, N.Y.)

S3—vitrified glass bond (Saint-Gobain Abrasives, Worcester, Mass.)

SiC F80, F100, P120—Silicon carbide abrasive grain, sizes F80, F100, and P120 (Saint-Gobain Ceramics, Worcester, Mass.)

Silquest A1100—gamma-Aminopropyltriethoxysilane (OSi Specialties, Middlebury, Conn.).

TRM0583—Cryolite, sodium hexafluoaluminate ($Na_3AlF_6$) (generally available, CAS No. 15096-52-3) (Washington Mills Electro Minerals Corp., Niagara Falls, N.Y.)

Phenolic resin belt—Commercially available having a phenolic resin bond aggregate and SiC grain P120.

Example 1

Aggregate—Starch Grafted Acrylic Polystyrene

A first sample of (Sample 1) of an abrasive aggregate was formed by mixing together a formaldehyde-free polymer binder, a starch grated acrylic polystyrene binder (Degree SGA+40 and Degree+27) and microparticle SiC abrasive grains. The grains and binder were placed in a pan mixer (Eirich mixer, Maschinenfabrik Gustav Eirich GmbH & Co KG, Germany) and agitated until well mixed, such as for about 15 minutes at 15-20 rpm. The concentrations for components are shown in the table below.

TABLE 1

| | Starch Grafted Polystyrene Binder | | | | |
|---|---|---|---|---|---|
| Sample 1 | Uncured Weight (lb) | Uncured Wt % (Total) | % solids | Cured/Dry weight (lb) | Wt % (dry) |
| Abrasive grains (SiC F80) | 15 | 94.04% | 100.00% | 15 | 97.71% |
| Formaldehyde-free polymer Binder (Degree +40 Resin Degree +27 Hardener) | 0.95 | 5.96% | 37.00% | 0.3515 | 2.29% |
| Total | 15.95 | 100.00% | | 15.3515 | 100.00% |

The mixture was collected and granulated by passing the mixture through a sieve with a mesh size of 8 (Sweco, Florence, Ky.). The resulting aggregate precursor granules were collected and placed onto a vibrating table (custom built—hereinafter "IR table") having two heating zones heated by infrared lamps set to temperatures of approximately 116° C. and 140° C. The precursor granules were simultaneously dried and cured to form abrasive aggregates by undergoing two passes on the IR table.

It was observed that the resin bond was completely cured after processing on the IR table and no further heating or firing was required. It was also observed that the cured aggregate floated on water and was somewhat hydrophobic.

Example 2

Aggregate—Starch Grafted Acrylic Polystyrene w/Silane Surface Treatment

A second sample of (Sample 2) of an abrasive aggregate was prepared by surface treating some of the Sample 1 aggregate by soaking it in an aqueous solution of Silquest A1100 Aminopropyltriethoxysilane. The silane solution was prepared by adding 3.5 grams of the A1100 drop by drop per 100 grams of water while monitoring and maintaining the pH in a range of 6 to 7 by the addition of glacial acetic acid. The solution was mixed for 2.5 hours until it was clear and no longer hazy. The abrasive aggregate was then soaked in the solution for about 15 minutes. The solution was decanted and the aggregate allowed to air dry overnight in a fume hood.

Example 3

Aggregate—Starch Grafted Acrylic Polystyrene w/Added Secondary Cross-Linking Agent A third sample of (Sample 3) of an abrasive aggregate was formed by mixing together a starch grafted acrylic polystyrene binder and microparticle SiC abrasive grains as in Example 1, except that Silquest A1100 Aminopropyltriethoxysilane was added to the mixture containing the binder and abrasive grains. The concentrations for components are shown in the table below.

TABLE 2

Starch Grafted Polystyrene Binder w/Secondary Cross-Linker

| Sample 3 | Uncured Weight (lb) | Uncured Wt % (Total) | % solids | Cured/Dry weight (lb) | Wt % (dry) |
| --- | --- | --- | --- | --- | --- |
| Abrasive grains (SiC F80) | 15 | 93.96% | 100.00% | 15 | 97.62% |
| Formaldehyde-free polymer Binder (Degree +40 Resin Degree +27 Hardener) | 0.95 | 5.95% | 37.00% | 0.3515 | 2.29% |
| Secondary Cross-linker/ wetting agent (A1100) | 0.01433005 | 0.09% | 100.00% | 0.01433005 | 0.09% |
| Total | 15.96433 | 100.00% | | 15.36583 | 100.00% |

The mixture was granulated and then cured in the same manner described above for Example 1 to produce abrasive aggregates.

Example 4

Aggregate—Modified Polycarboxylic Acid Cross-Linked with a Polyol

A fourth sample of (Sample 4) of an abrasive aggregate was formed by mixing together an aqueous formaldehyde-free modified polycarboxylic acid dispersion cross-linked with a polyhydric alcohol (Acrodur 950L) and SiC abrasive grains in a pan mixer in a similar manner as described above in Example 1. The concentrations for components are shown in the table below.

TABLE 3

Modified Polycarboxylic Acid Binder

| Sample 4 | Uncured Weight (lb) | Uncured Wt % (Total) | % solids | Cured/Dry weight (lb) | Wt % (dry) |
| --- | --- | --- | --- | --- | --- |
| Abrasive grain (SiC F80) | 15 | 93.75% | 100.00% | 15 | 96.90% |
| Formaldehyde-free polymer Binder (BASF Acrodure 950L) | 1 | 6.25% | 48.00% | 0.48 | 3.10% |
| Total | 16 | 100.00% | | 15.48 | 100.00% |

The mixture was granulated and then cured in the same manner described above for Example 1 to produce abrasive aggregates.

Example 5

Aggregate—Modified Polycarboxylic Acid Cross-Linked with a Polyol w/Silane Surface Treatment A fifth sample of (Sample 5) of an abrasive aggregate was prepared by surface treating some of the Sample 4 aggregate by soaking it in an aqueous solution of Silquest A1100 Aminopropyltriethoxysilane. The silane solution was prepared and the abrasive aggregate was soaked, collected, and allowed to dry in the same manner described above in Example 2.

Example 6

Aggregate—Modified Polycarboxylic Acid w/Added Secondary Cross-Linking Agent

A sixth sample of (Sample 6) of an abrasive aggregate was formed by mixing together Acrodur 950L and SiC abrasive grains in a pan mixer in a similar manner as described above in Example 4, except that Silquest A1100 Aminopropyltriethoxysilane was added to the mixture containing the binder and abrasive grains. The concentrations for components are shown in the table below.

TABLE 4

Starch Grafted Polystyrene Binder w/Secondary Cross-Linker

| Sample 6 | Uncured Weight (lb) | Uncured Wt % (Total) | % solids | Cured/Dry weight (lb) | Wt % (dry) |
|---|---|---|---|---|---|
| Abrasive grain (SiC F80) | 15 | 93.66% | 100.00% | 15 | 96.80% |
| Formaldehyde-free polymer Binder (BASF Acrodure 950L) | 1 | 6.24% | 48.00% | 0.48 | 3.10% |
| Secondary cross-linking/ wetting agent (A1100) | 0.01543236 | 0.10% | 100.00% | 0.01543236 | 0.10% |
| Total | 16.0154324 | 100.00% | | 15.4954324 | 100.00% |

The mixture was granulated and then cured in the same manner described above for Example 1 to produce abrasive aggregates.

Example 7

Comparative Sample—S3 Glass Bond

A comparative sample of (Sample 7) of an abrasive aggregate was formed by mixing together a vitreous glass bond material (S3) and SiC abrasive grains in a pan mixer in a similar manner as described above in Example 1. The aggregate precursor material was also collected and granulated in the same manner as described above in Example 1. However, due to the nature of the vitreous, the precursor granules had to be fired at temperature of 950° C. for an hour to form an abrasive aggregate. The concentrations for the components of the formed aggregates are shown in the table below.

TABLE 5

Comparative Glass Bond Aggregate

| Sample 7 | Cured/Dry weight (lb) | Wt % (dry) |
|---|---|---|
| Abrasive grain (SiC F80) | 20 | 95.83% |
| Glass Binder (S3) | 0.87 | 4.17% |
| Total | 20.87 | 100.00% |

The formed abrasive aggregate was collected.

Example 8

Crush Testing and Loose Pack Density

The aggregate Samples 1-6 and the comparative Sample 7 were then subjected to crush % testing as follows. The aggregate sample was screened between mesh size 35 and 45; and 5 grams of the sample were placed in a one inch die. The die was then subjected to a pressure of 5 MPa. The collected aggregate was again screened and the amount that passed through to be collected on a 45 mesh screen was recorded. The higher the percentage of material that passed through the screen, the greater the amount of material that was crushed, thus indicating a weaker aggregate. Table 6 shows the crush % of the sample aggregates Samples 1-6 and the comparative aggregates Sample 7.

Aggregates of Samples 1-6 and Sample 7 were screened at mesh size (−18/+60) and the product collected to determine loose pack density. To determine loose pack density, the aggregate is poured through a funnel in a 100 cc cup. Any excess material is removed with a blade and the cup is weighed. The loose pack density is equal to the weight divided by the cup volume.

The crush % and loose pack density for the samples are presented in the table below.

TABLE 6

Crush % and Loose Pack Density

| | Crush % (−35/+45) @ 5 Mpa - uncured | Crush % (−35/+45) @ 5 Mpa - cured | Loose Pack Density (−18/+60) - cured |
|---|---|---|---|
| Sample 1 | 86 | 65 | 1 |
| Sample 2 | — | 53 | 1.1 |
| Sample 3 | 77 | 56 | 1.1 |
| Sample 4 | 60 | 32 | 1 |
| Sample 5 | — | 45 | 0.9 |
| Sample 6 | 56 | 25 | 1 |

TABLE 6-continued

Crush % and Loose Pack Density

|  | Crush % (−35/+45) @ 5 Mpa - uncured | Crush % (−35/+45) @ 5 Mpa - cured | Loose Pack Density (−18/+60) - cured |
|---|---|---|---|
| Sample 7—Comparative glass bond | — | 54 | 1.1 |

Example 9

Coated Abrasive Testing—Wet Centerless Test

Abrasive aggregates (Samples 1-7) were incorporated into abrasive belts for wet centerless testing. Belts were converted in size of 3"×98" and tested on a Loeser wet centerless machine. Grinding force was set at 30 lb. The test material was stainless steel (304SS). The test part size was 1.5" OD and 20" long. A coolant fluid (2% trimclear) was used during grinding. Testing stopped at 120 grinds.

Figure 3:
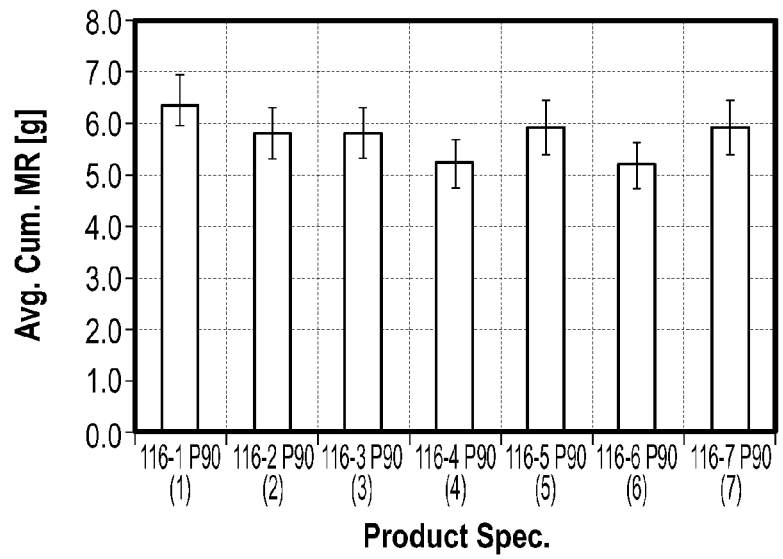
FIG. 3—is a graph comparing the cumulative mass removal rate achieved during an abrasion test of coated abrasives belts prepared according to the present disclosure and a commercially available belt employing a glass bonded aggregate.
Figure 4:
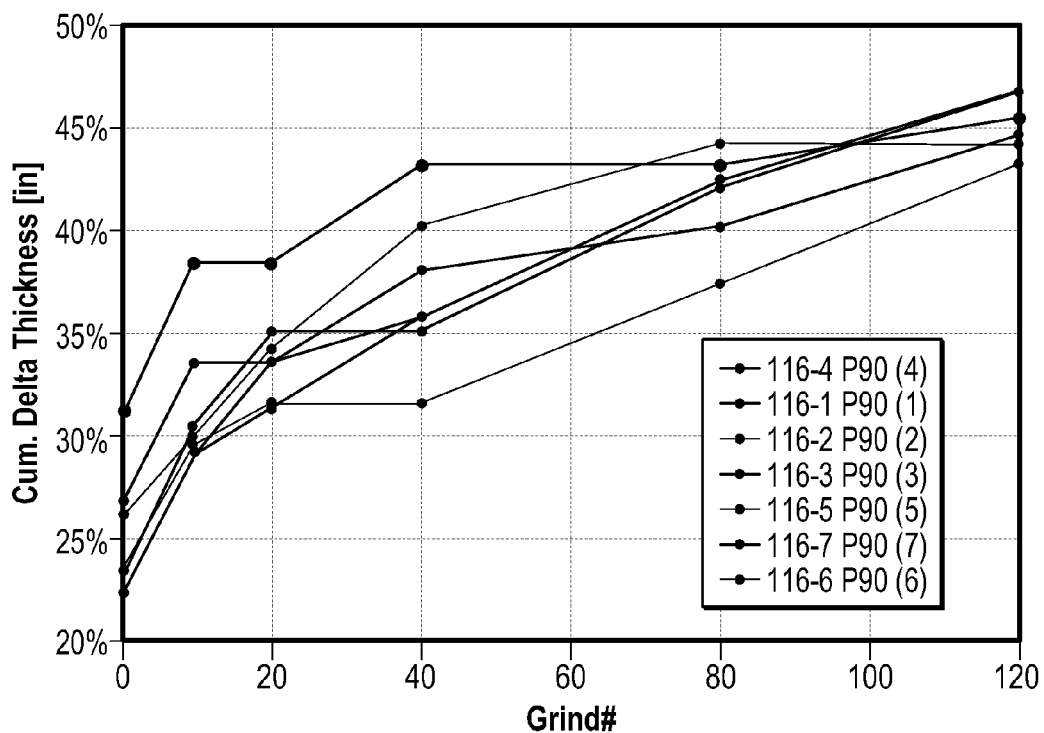
FIG. 4—is a graph comparing the relative belt wear experienced during an abrasion test of coated abrasives belts prepared according to the present disclosure and a commercially available belt employing a glass bonded aggregate.
Figure 5:
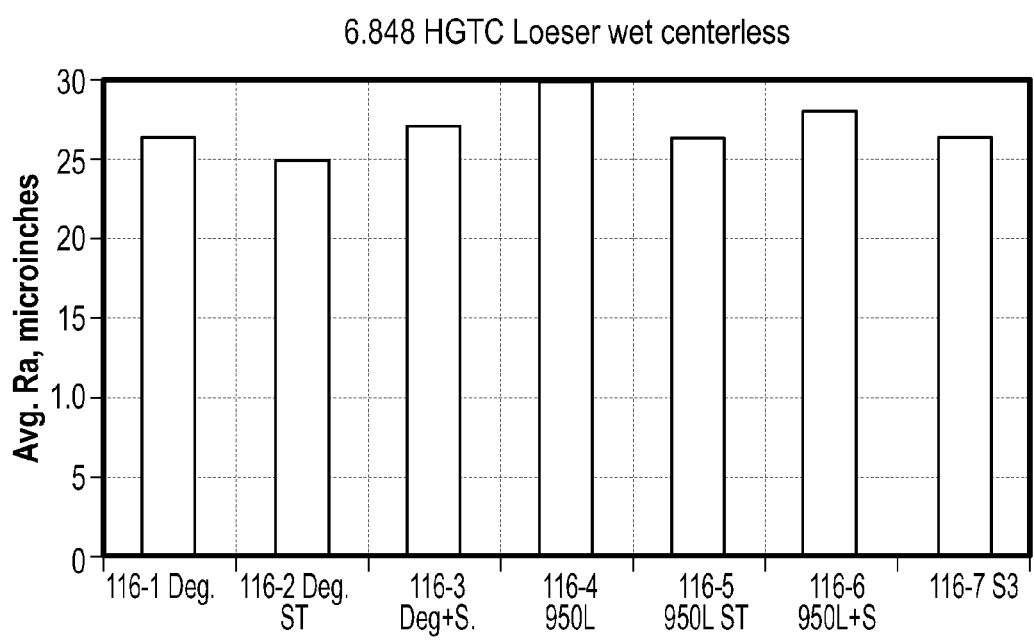
FIG. 5—is a graph comparing the average surface roughness (Ra) of a surface during an abrasion test of coated abrasives belts prepared according to the present disclosure and a commercially available belt employing a glass bonded aggregate.
Figure 6:
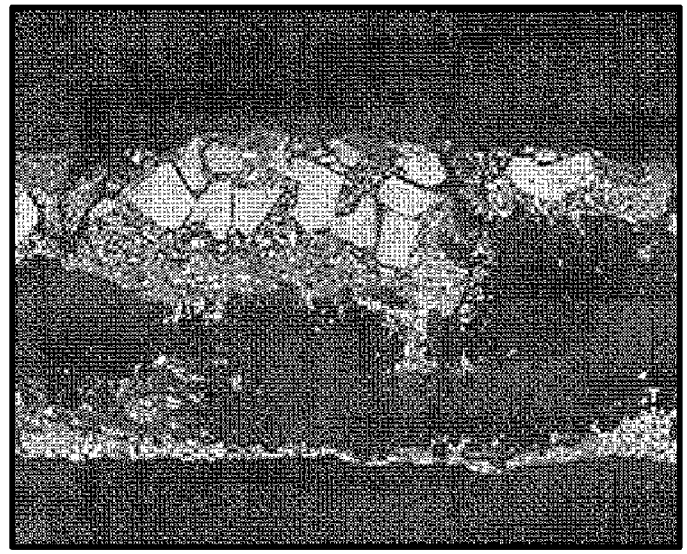
FIG. 6—is a scanning electron micrograph showing a cross-section of an abrasive belt incorporating abrasive aggregates according to the present disclosure.
Figure 7:
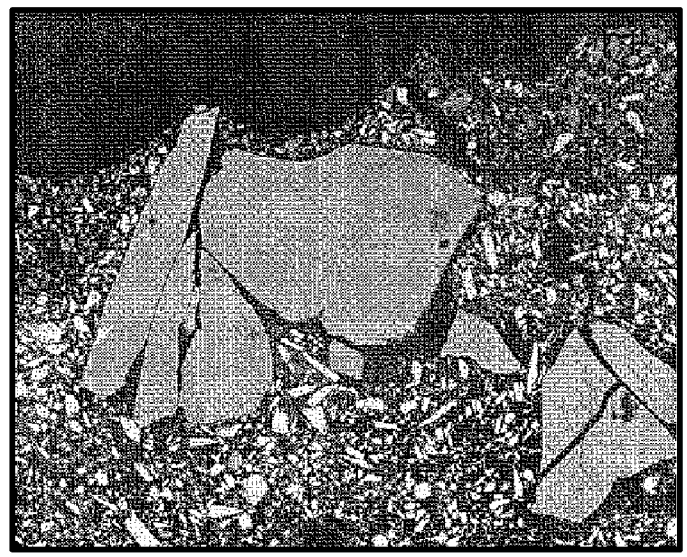
FIG. 7—is a scanning electron micrograph showing the same cross-section of abrasive belt as FIG. 6, but at a higher magnification.

As shown in FIG. 3, all belts had a similar average material removal rate (MRR); however, the Sample 1 belt had a higher MRR than the belt made with the Sample 7 glass bond. FIG. 2 shows that the cumulative change in belt thickness over time (i.e., belt wear) was similar for all Samples. The formaldehyde-free resin bond aggregate belts (Samples 1-6) generally showed the same or less belt wear than the glass bond aggregate belt (Sample 7) during the first 60 grinds and the Sample 6 and Sample 5 belts showed the lowest amount of belt wear at the end of the test. FIG. 3 shows that the average surface roughness (Ra) of the abraded test pieces was similar for all Samples. The test piece abraded with the Sample 2 belt was smoother than the piece abraded with the glass bond belt.

Example 10

Coated Abrasive Testing—Bench Backstand Testing

Abrasive aggregates (Samples 1-7) were incorporated into abrasive belts for testing. Belt was 2.5"×60" and tested on a Bench Backstand machine. Grinding force was set at 10 lb. The product speed was 3000 SFM and the test speed was 7 SFM. The test material was stainless steel (304SS) with dimensions of ½"×3"×9¾". Testing stopped after 10 minutes of grinding.

Figure 8:
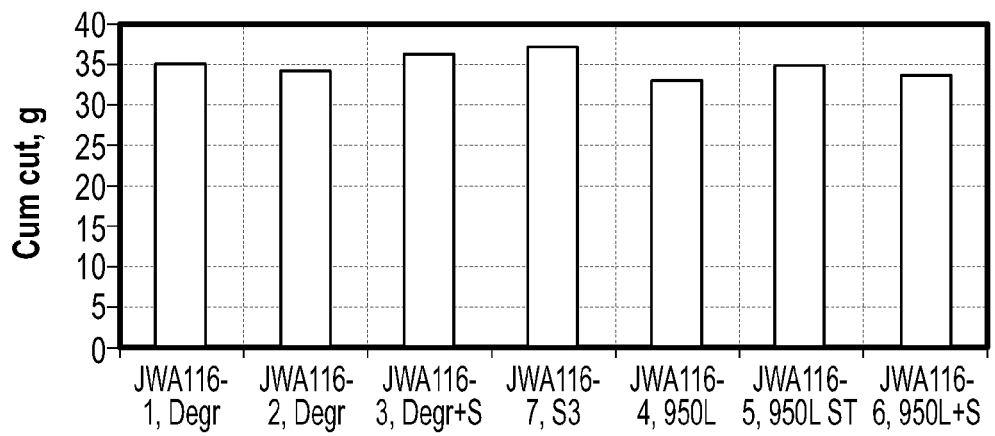
FIG. 8—is a graph comparing the cumulative mass removal rate achieved during an abrasion test of coated abrasives belts prepared according to the present disclosure and a commercially available belt employing a glass bonded aggregate.
Figure 9:
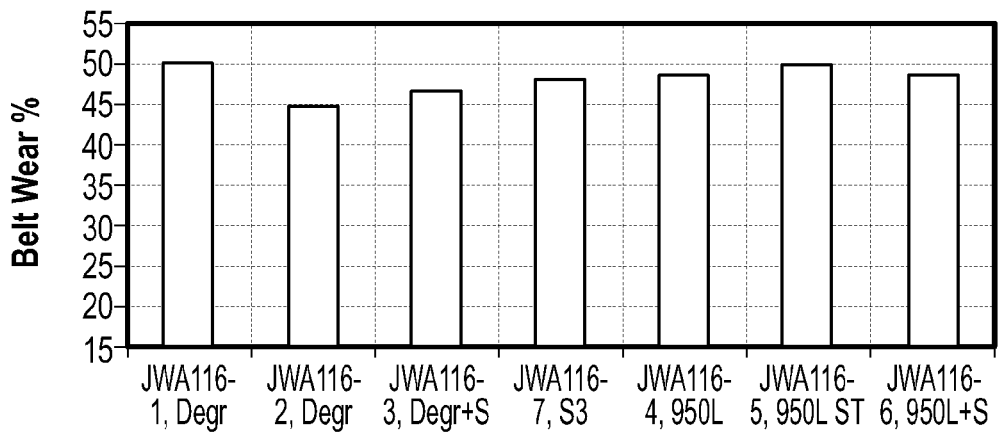
FIG. 9—is a graph comparing the relative belt wear experienced during an abrasion test of coated abrasives belts prepared according to the present disclosure and a commercially available belt employing a glass bonded aggregate.
Figure 10:
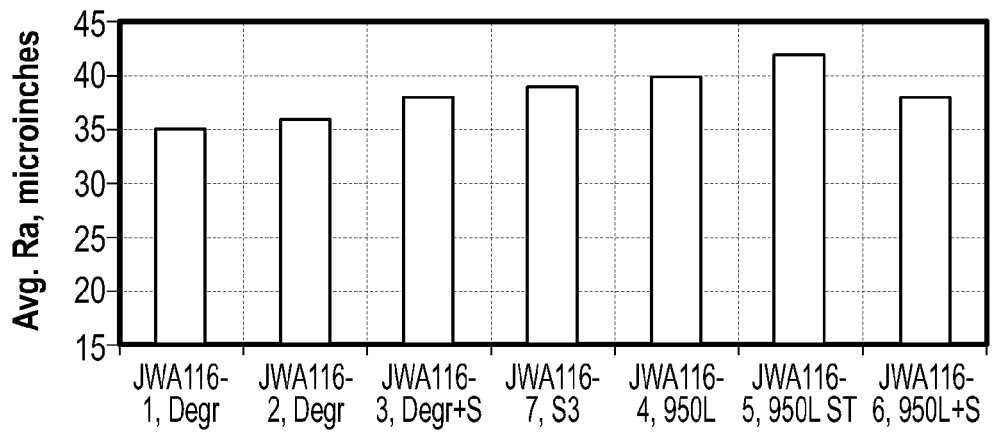
FIG. 10—is a graph comparing the average surface roughness (Ra) of a surface during an abrasion test of coated abrasives belts prepared according to the present disclosure and a commercially available belt employing a glass bonded aggregate.
Figure 11:
FIG. 11—is a scanning electron micrograph showing a top view of an abrasive belt incorporating a first type of abrasive aggregates according to the present disclosure.
Figure 12:
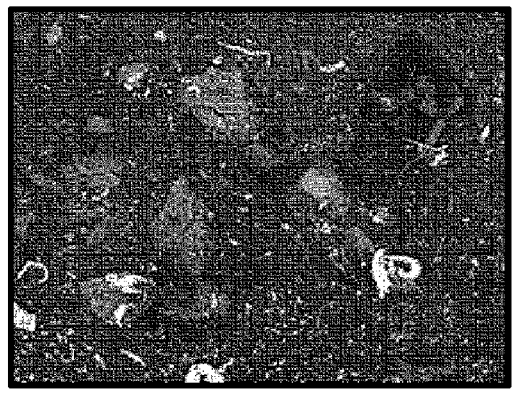
FIG. 12—is a scanning electron micrograph showing a top view of an abrasive belt incorporating a second type of abrasive aggregates according to the present disclosure.
Figure 13:
FIG. 13—is a scanning electron micrograph showing a top view of an abrasive belt incorporating a third type of abrasive aggregates according to the present disclosure.
Figure 14:
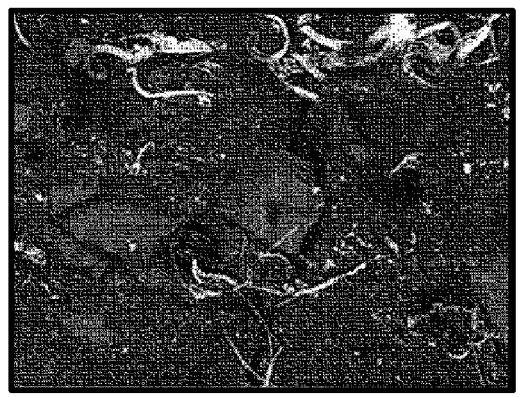
FIG. 14—is a scanning electron micrograph showing a top view of an abrasive belt incorporating a fourth type of abrasive aggregates according to the present disclosure.
Figure 15:
FIG. 15—is a scanning electron micrograph showing a top view of an abrasive belt incorporating a fifth type of abrasive aggregates according to the present disclosure.
Figure 16:
FIG. 16—is a scanning electron micrograph showing a top view of an abrasive belt incorporating a sixth type of abrasive aggregates according to the present disclosure.
Figure 17:
FIG. 17—is a scanning electron micrograph showing a top view of a comparative abrasive belt incorporating commercially available abrasive aggregates having a glass bond.

FIG. 8-10 show results of cumulative material removal (cumulative "cut"), belt wear, and average surface roughness. FIG. 8 shows all of the Sample 1-6 belts having a similar cut approaching that of the comparative glass bond aggregate belt (Sample 7). FIG. 9 shows all the belts having about the same belt wear, with Samples 2 and 3 showing less belt wear than comparative Sample 7. FIG. 10 shows that the belts for Samples 1-3 provided a smoother finish than for comparative Sample 7, while Samples 4-6 provided a coarser surface finish.

The used belts were examined using scanning electron microscopy (SEM) and micrographs are shown in FIG. 11-17.

Example 11

Modified Polycarboxylic Acid Binder Aggregate—Rotary Calciner

An eighth sample of (Sample 8) of an abrasive aggregate was prepared by mixing together Acrodur 950L and SiC abrasive grains in a pan mixer as described above in Example 1. The mixture was also granulated and cured as described above in Example 1; however, the aggregates were then passed into an indirect rotary calciner (Harper International Corp, Lancaster, N.Y.). The metal tube of the rotary calciner had an inside diameter of 6 inches and a length of 10 feet. The tilt angle was set at 3.5 degrees and the rotation at 5 rpm. The calciner had three temperature zones, which were set at approximately 350° C., 350° C., and 280° C. The concentrations for components are shown in the table below.

TABLE 7

Aggregate—Acrodur 950L Aggregate—Rotary Calciner

| Sample 8 | Uncured Weight (lb) | Uncured Wt % (Total) | % solids | Cured/Dry weight (lb) | Wt % (dry) |
|---|---|---|---|---|---|
| Abrasive grain (SiC F100) | 15 | 93.75% | 100.00% | 15 | 96.90% |
| Formaldehyde-free polymer Binder (BASF Acrodure 950L) | 1 | 6.25% | 48.00% | 0.48 | 3.10% |
| Total | 16 | 100.00% |  | 15.48 | 100.00% |

Abrasive aggregates were collected from the rotary calciner.

Example 12

Starch Grafted Acrylic Polystyrene Binder Aggregates—Rotary Calciner

A ninth sample of (Sample 9) of an abrasive aggregate was prepared by mixing together a starch grafted acrylic polystyrene binder (Degree SGA+40 and Degree+27) with SiC abrasive grains in a pan mixer as described above in Example 1. The mixture was also granulated and cured as described above in Example 1; however, the aggregates were then passed into an indirect rotary calciner as described above in Example 11, except that the calciner temperature zones were set at approximately 300° C., 300° C., and 250° C. The concentrations of the components are shown in the table below.

TABLE 8

Aggregate—Degree SGA +40 Aggregate—Rotary Calciner

| Sample 9 | Uncured Weight (lb) | Uncured Wt % (Total) | % solids | Cured/Dry weight (lb) | Wt % (dry) |
|---|---|---|---|---|---|
| Abrasive grain (SiC F100) | 15 | 93.93% | 100.00% | 15 | 97.66% |
| Formaldehyde-free polymer Binder (Degree +40 Resin Degree +27 Hardener) | 0.97 | 6.07% | 37.00% | 0.3589 | 2.34% |
| Total | 15.97 | 100.00% | | 15.3589 | 100.00% |

Abrasive aggregates were collected from the rotary calciner.

Example 13

Comparative Sample—S3 Glass Bond

A comparative sample of (Sample 10) of an abrasive aggregate was formed by mixing together S3 glass bond material and SiC abrasive grains in a pan mixer in a similar manner as described above in Example 1. The aggregate precursor material was, as previously described in Example 7, granulated and fired in an oven to produce abrasive aggregate. The concentrations for the components of the formed aggregates are shown in the table below.

TABLE 9

Comparative Glass Bond Aggregate

| Sample 10 | Cured/Dry weight (lb) | Wt % (dry) |
|---|---|---|
| Abrasive grain (SiC F100) | 15 | 95.85% |
| Glass Binder (S3) | 0.65 | 4.15% |
| Total | 15.65 | 100.00% |

The formed abrasive aggregate was collected.

Example 14

Starch Grafted Acrylic Polystyrene Binder Aggregates w/Grinding Aid

An eleventh sample of (Sample 9) of an abrasive aggregate was prepared by mixing together a starch grafted acrylic polystyrene binder (Degree SGA+40 and Degree+27) with SiC abrasive grains in a pan mixer as described above in Example 1, except a grinding aid, potassium borofluoride ($KBF_4$) was added to the mixture. The mixture was granulated and cured as described above in Example 1. The concentrations of the components are shown in the table below.

TABLE 10

Aggregate—Degree SGA +40 Aggregate w/$KBF_4$

| Sample 11 | Uncured Weight (lb) | Uncured Wt % (Total) | % solids | Cured/Dry weight (lb) | Wt % (dry) |
|---|---|---|---|---|---|
| Abrasive grit (SiC F100) | 15 | 89.98% | 100.00% | 15 | 93.59% |
| Formaldehyde-free polymer Binder (Degree +40 Resin Degree +27 Hardener) | 1.02 | 6.12% | 37.00% | 0.3774 | 2.35% |
| Grinding aid (KBF4) | 0.65 | 3.90% | 100.00% | 0.65 | 4.06% |
| Total | 16.67 | 100.00% | | 16.0274 | 100.00% |

The formed abrasive aggregate was collected.

Example 15

Starch Grafted Acrylic Polystyrene Binder Aggregates w/Grinding Aid

A twelfth sample of (Sample 12) of an abrasive aggregate was prepared by mixing together a starch grafted acrylic polystyrene binder (Degree SGA+40 and Degree+27) with SiC abrasive grains in a pan mixer as described above in Example 1, except a grinding aid, cryolite ($Na_3AlF_6$) was added to the mixture. The mixture was granulated and cured as described above in Example 1. The concentrations of the components are shown in the table below.

TABLE 11

| Aggregate—Degree SGA +40 Aggregate w/KBF4 | | | | | |
|---|---|---|---|---|---|
| Sample 12 | Uncured Weight (lb) | Uncured Wt % (Total) | % solids | Cured/Dry weight (lb) | Wt % (dry) |
| Abrasive grit (SiC F100) | 15 | 89.13% | 100.00% | 15 | 92.70% |
| Formaldehyde-free polymer Binder (Degree +40 Resin Degree +27 Hardener) | 1.03 | 6.12% | 37.00% | 0.3811 | 2.36% |
| Grinding aid—Cryolite ($Na_3AlF_6$) | 0.8 | 4.75% | 100.00% | 0.8 | 4.94% |
| Total | 16.83 | 100.00% | | 16.1811 | 100.00% |

Figure 18:
FIG. 18—is a scanning electron micrograph showing abrasive aggregates including a grinding aid according to the present disclosure.
Figure 19:
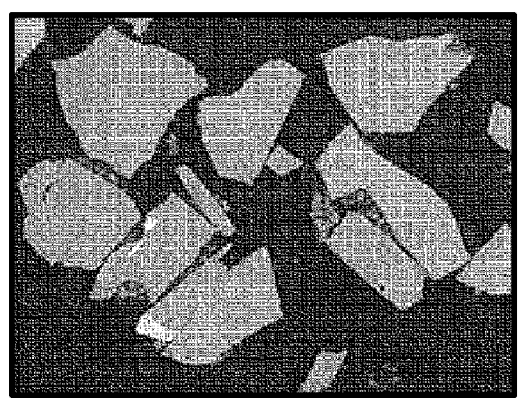
FIG. 19—is a scanning electron micrograph showing a same cross-section of an abrasive belt incorporating abrasive aggregates including a grinding aid according to the present disclosure.

The formed abrasive aggregate was collected. FIG. 18 shows a micrograph of the formed aggregates. FIG. 19 shows a cross-section view of the formed aggregates.

Example 16

Crush Testing and Loose Pack Density

The aggregate Samples 8-9, 11-12, and the comparative Sample 10 were subjected to crush % testing and loose pack density testing as described above in Example 8. The crush % and loose pack density for the samples is presented in the table below.

TABLE 12

| Crush % and Loose Pack Density | | | |
|---|---|---|---|
| | Crush % (−35/+45) @ 5 Mpa - uncured | Crush % (−35/+45) @ 5 Mpa - cured | Loose Pack Density (−18/+60) - cured |
| Sample 8 | — | 78 | 1 |
| Sample 9 | — | 61 | 1 |
| Sample 10— Comparative glass bond | — | 75 | 1 |
| Sample 11 | 65 | 44 | 1 |
| Sample 12 | — | 58 | 1 |

Example 17

Hammond Test

[Abrasive aggregates (Samples 8-9 and 11-12) were incorporated into abrasive belts for grind testing. A commercially available belt using a phenolic resin bond was used a comparative sample. Outside diameter grind testing was conducted on a Hammond grinder, model 110 VTDL machine. Belt size was 2"×132". Grinding force was set at 65 lb, constant. The test material was stainless steel (304SS). The test part size was 5" OD×4" ID×2" wide. Speed of the contact wheel was 2046 rpm, 7500 sfpm. Speed of the part was 24 rpm, 31 sfpm. Total grinding time was 60 minutes.

Figure 20:
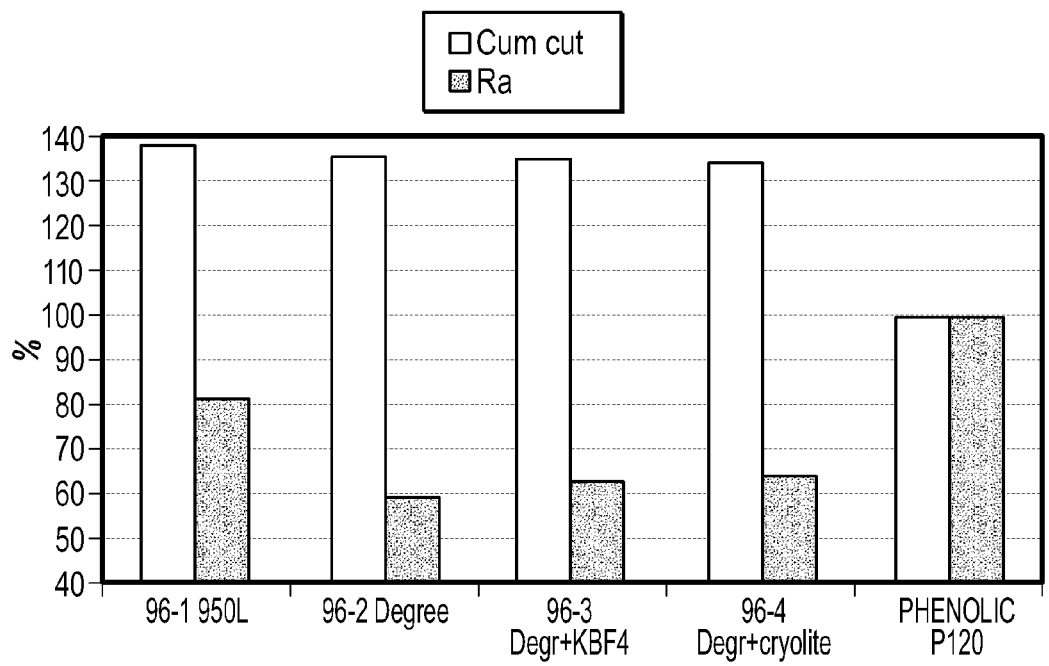
FIG. 20—is a graph comparing cumulative cut rate and surface roughness (Ra) produced by abrasive belts incorporating abrasive aggregate according to the present disclosure with a commercially available abrasive belt having a phenolic resin bond.
Figure 21:
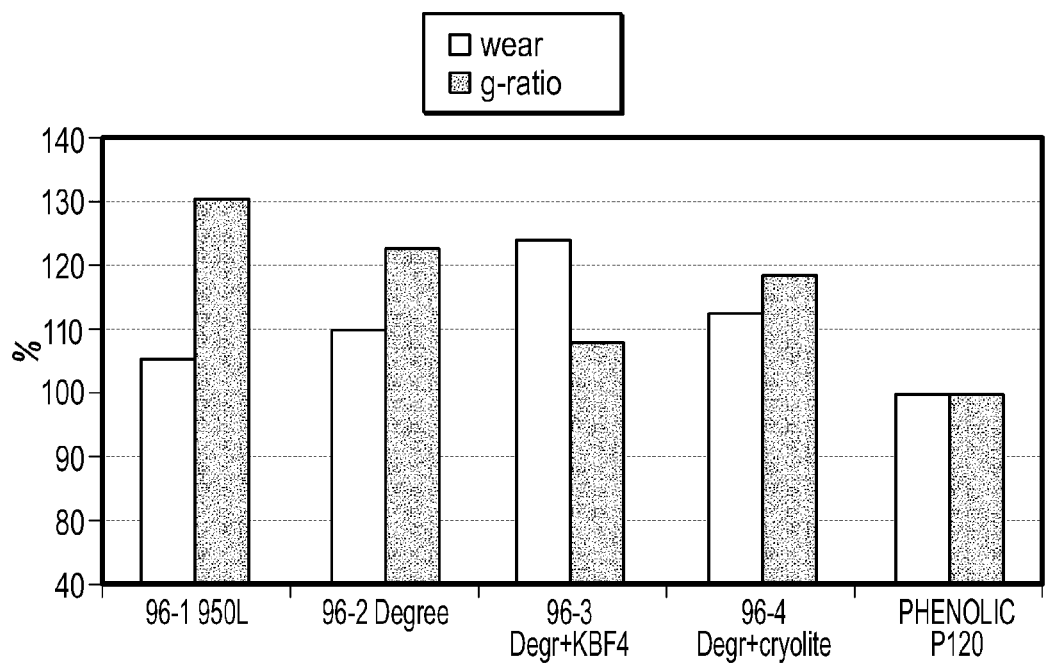
FIG. 21—is a graph comparing belt wear and grind ratio (g-ratio) produced by abrasive belts incorporating abrasive aggregate according to the present disclosure with a commercially available abrasive belt having a phenolic resin bond.
Figure 22:
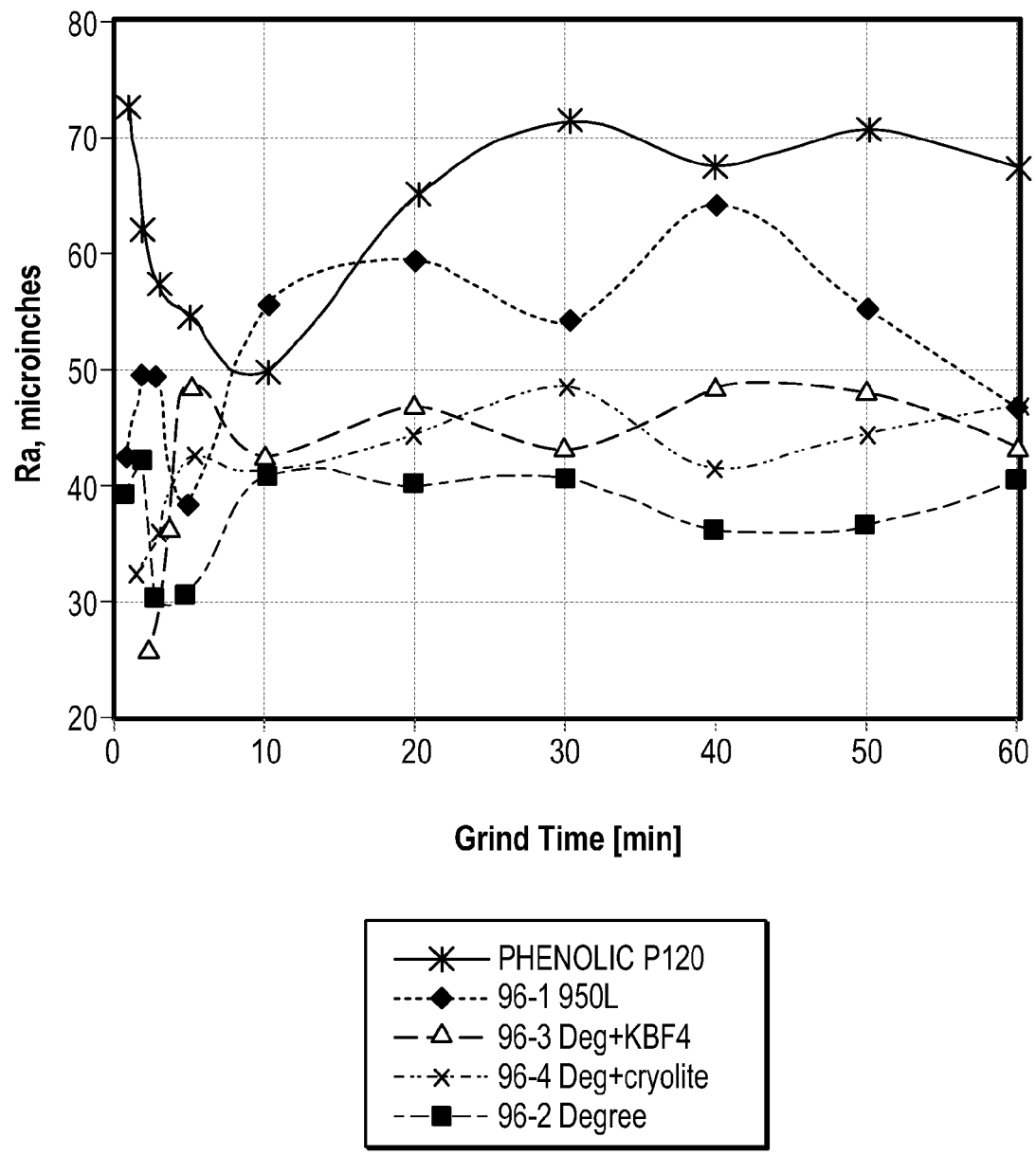
FIG. 22—is a graph showing comparative surface roughness with grinding time for a surface abraded with abrasive belts incorporating abrasive aggregate according to the present disclosure compared to a commercially available abrasive belt having a phenolic resin bond.

As shown in FIG. 20, belts for Samples 8-9 and 10-12 all had cumulative cut rates that were more than 130% that of the commercially available belt having a phenolic resin bond. Belts for Samples 8-9 and 10-12 all produced a smoother surface finish on the test pieces than the phenolic resin bond belt. The average surface roughness (Ra) for Sample 8 was only 80% that of the phenolic resin bond, while the Ra for Sample 9 was even lower, less than 60% that of the phenolic resin bond. Samples 10-11, which contained grinding aids, both produced Ra values of less than 70% of the phenolic resin bond. FIG. 21 shows belt wear and grind ratio (g-ratio) values for Samples 8-9 and 10-11 compared to the phenolic resin bond belt. Although Samples 8-9 and 10-11 all had higher belt wear than the phenolic resin bond belt, they all also had a higher g-ratio (amount of cumulative cut divided by amount of belt wear) than the phenolic resin bond belt. Sample 8 and 9 had a g-ratios of over 130% and over 120% that of the phenolic resin bond belt. Samples 10 and 11 had g-ratios of just under 110% and just under 120% that of the phenolic resin bond belt.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An aggregate forming mixture comprising:
   about 80.0 to about 99.0 wt. % of a plurality of microparticle abrasive grains; and
   about 20.0 to about 1.0 wt. % of a formaldehyde-free polymer resin dispersion,
   wherein the formaldehyde-free polymer resin dispersion comprises a waterborne polymer resin dispersion, and
   wherein the waterborne polymer resin dispersion comprises a starch grafted resin.

2. The aggregate forming mixture of claim 1 further comprising:
   about 0.01 wt. % to about 0.15 wt. % of an organosilane.

3. A cured aggregate comprising:
   about 95.0 to about 99.0 wt. % of a plurality of microparticle abrasive grains; and
   about 5.0 to about 1.0 wt. % of a formaldehyde-free polymer binder,
   wherein the formaldehyde-free polymer binder comprises a starch grafted binder.

4. The cured aggregate of claim 3, wherein the starch grafted binder comprises a starch grafted polystyrene binder.

5. The cured aggregate of claim 4, wherein the starch grafted polystyrene binder is the reaction product of cross-linking a starch grafted polystyrene resin with one of the group consisting of polyamidoamide epichlorohydrin, TACT triazine cross-linker, epoxy silanes, zirconium ammonium carbonate, glyoxal, blocked glyoxal, water dispersed blocked isocyanates, water dispersible epoxies, and water dispensable isocyanates.

6. The cured aggregate of claim 4, wherein the starch grafted polystyrene binder comprises one of a polyamidoamide group, a TACT triazyl group, a silyl group, a glyoxyl group, a blocked glyoxyl group, a blocked carbamate group, an alpha-hydroxy-alkoxy group, or a carbamate group.

7. The cured aggregate of claim 3 further comprising:
    about 0.01 wt. % to about 0.15 wt. % of an organosilane.

8. The cured aggregate of claim 7, wherein the organosilane is an aminosilane.

9. The cured aggregate of claim 8, wherein the aminosilane is an aminopropyltriethoxysilane.

10. The cured aggregate of claim 3, wherein the cured aggregate has a crush % of at least about 55, wherein the crush % is measured at a load of 5 Mpa and a sieve mesh size of (−35/+45).

11. The cured aggregate of claim 3, wherein the cured aggregate has a loose packed density of less than or equal to 1.2.

12. The cured aggregate of claim 3, wherein the cured aggregate has an average size in a range not less than about 10 microns to not more than about 2500 microns.

13. The cured aggregate of claim 3, having a coating of an organosilane.

14. An abrasive article, comprising:
    a plurality of cured abrasive aggregates, wherein the cured abrasive aggregates comprise about 95.0 to about 99.0 wt. % of a plurality of microparticle abrasive grains and about 5.0 to about 1.0 wt. % of a formaldehyde-free polymer binder, wherein the formaldehyde-free polymer binder comprises a starch grafted binder, and wherein the plurality of cured abrasive aggregates are bonded to a substrate.

15. The abrasive article of claim 14, wherein the abrasive article has a grind ratio (G-ratio) greater than 110% that of a comparable abrasive article whose only difference is the presence of a phenolic resin binder in place of the formaldehyde-free polymer binder.

16. A cured aggregate comprising,
    about 95.0 to about 99.0 wt. % of a plurality of microparticle abrasive grains; and
    about 5.0 to about 1.0 wt. % of a formaldehyde-free polymer binder,
    the cured aggregate having a coating of an organosilane.

* * * * *